United States Patent
Anderson et al.

(10) Patent No.: US 10,960,658 B2
(45) Date of Patent: Mar. 30, 2021

(54) DETECTING A LEVEL OF PRINTABLE FLUID IN A CONTAINER

(71) Applicant: HEWLETT-PACKARD DEVELOPMENT COMPANY, L.P., Houston, TX (US)

(72) Inventors: Daryl E. Anderson, Corvallis, OR (US); James Michael Gardner, Corvallis, OR (US); Michael W. Cumbie, Corvallis, OR (US); Scott A. Linn, Corvallis, OR (US); Berkeley Fisher, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 164 days.

(21) Appl. No.: 16/094,448

(22) PCT Filed: Jul. 11, 2016

(86) PCT No.: PCT/US2016/041729
§ 371 (c)(1),
(2) Date: Oct. 17, 2018

(87) PCT Pub. No.: WO2018/013078
PCT Pub. Date: Jan. 18, 2018

(65) Prior Publication Data
US 2019/0118527 A1    Apr. 25, 2019

(51) Int. Cl.
*B41F 31/02*    (2006.01)
*B41L 27/04*    (2006.01)
*G01F 23/24*    (2006.01)
*G01F 23/26*    (2006.01)
*B41L 39/02*    (2006.01)
*G01F 23/22*    (2006.01)

(52) U.S. Cl.
CPC ............ *B41F 31/022* (2013.01); *B41L 27/04* (2013.01); *B41L 39/02* (2013.01); *G01F 23/22* (2013.01); *G01F 23/247* (2013.01); *G01F 23/248* (2013.01); *G01F 23/263* (2013.01); *B41P 2233/30* (2013.01)

(58) Field of Classification Search
CPC ........ B41F 31/022; B41L 27/04; B41L 39/02; G01F 23/22; G01F 23/247; G01F 23/248
USPC ....................................................... 73/304 C
See application file for complete search history.

(56) References Cited

U.S. PATENT DOCUMENTS 5,206,668 A    4/1993    Lo et al.
5,682,184 A    10/1997   Stephany et al.
(Continued)

FOREIGN PATENT DOCUMENTS

WO    WO-1983000765 A1    3/1983
WO    WO-1992009867 A1    6/1992
WO    WO-2013015808 A1    1/2013

*Primary Examiner* — Tarun Sinha
(74) *Attorney, Agent, or Firm* — Fabian VanCott

(57) ABSTRACT

A method of detecting a level of printable fluid in a container includes, with at least one sensing location on a die in thermal contact with the printable fluid in the container, sensing a voltage of a capacitor over time as current from the capacitor leaks through a field effect transistor (FET). The FET and capacitor are associated with the sensing location. The method may further include, based on the voltage of the capacitor over time and a threshold voltage, determining whether the printable fluid is present at the at least one sensing location.

20 Claims, 12 Drawing Sheets

(56) References Cited

U.S. PATENT DOCUMENTS

| | | |
|---|---|---|
| 6,431,670 B1 | 8/2002 | Schantz et al. |
| 6,848,762 B2 | 2/2005 | King et al. |
| 7,013,804 B2 | 3/2006 | Chelvayohan |
| 7,234,787 B2 | 6/2007 | Grady et al. |
| 7,370,528 B2 | 5/2008 | Scardovi |
| 8,024,968 B2 * | 9/2011 | Sabanovic ........... B41J 2/17566 73/290 R |
| 2007/0076024 A1 | 4/2007 | Jeong et al. |

* cited by examiner

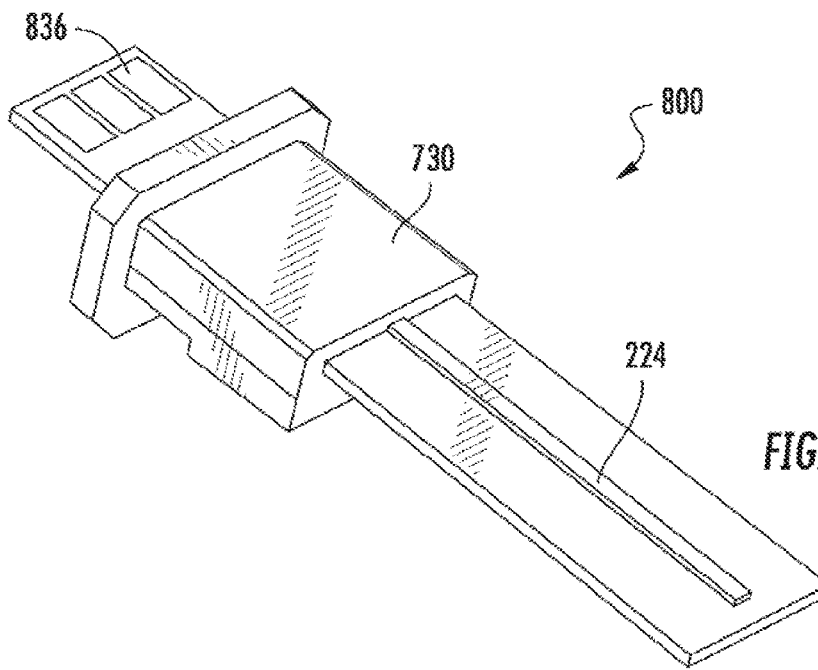
FIG. 13
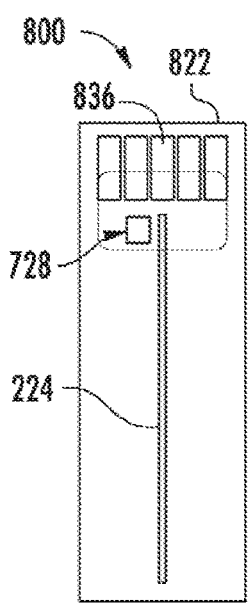
FIG. 14
FIG. 15
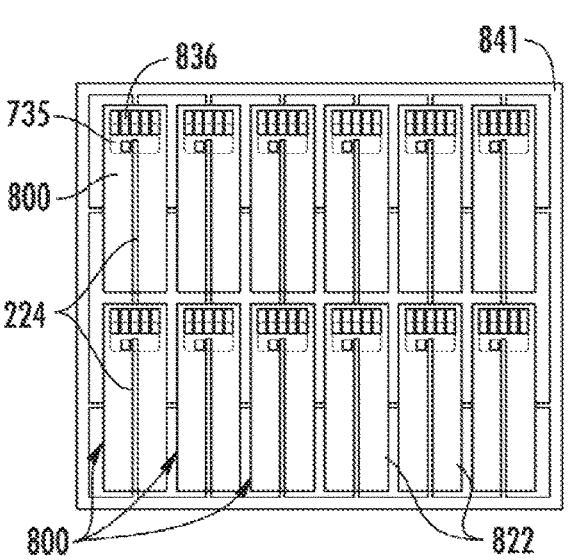
FIG. 17
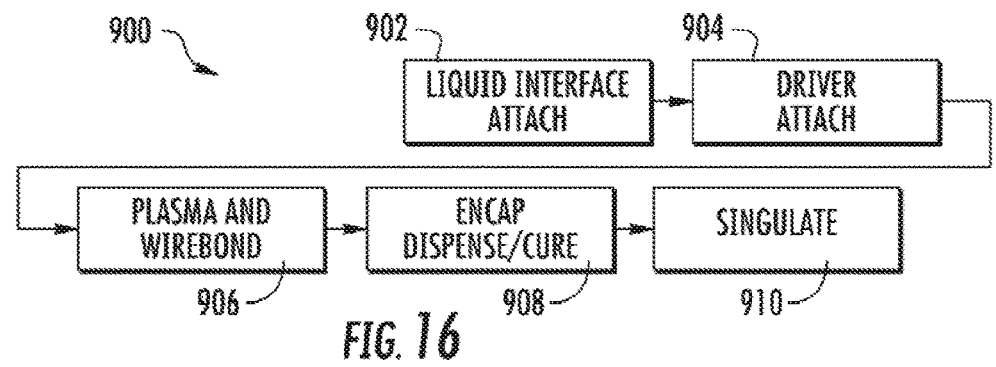
FIG. 16

DETECTING A LEVEL OF PRINTABLE FLUID IN A CONTAINER

BACKGROUND

Printing devices eject printable fluid onto print media in order to form an image or a structure on the print media. The printable fluid may be stored in a reservoir or other volume from which a printing device draws the printable fluid. Over time, the level or amount of printable fluid within the reservoir is depleted.

BRIEF DESCRIPTION OF THE DRAWINGS

The accompanying drawings illustrate various examples of the principles described herein and are a part of the specification. The illustrated examples are given merely for illustration, and do not limit the scope of the claims.

FIG. 13 is a perspective view of another example fluid level sensor, according to one example of the principles described herein.

FIG. 14 is a front view of the example fluid level sensor of FIG. 13, according to one example of the principles described herein.

FIG. 15 is a sectional view of the example fluid level sensor of FIG. 14, according to one example of the principles described herein.

FIG. 16 is a flow diagram of an example method for forming the example fluid level sensor of FIG. 13, according to one example of the principles described herein.

FIG. 17 is a front view of an example panel upon which multiple fluid level sensors have been formed, prior to singulation, according to one example of the principles described herein.

Throughout the drawings, identical reference numbers designate similar, but not necessarily identical, elements.

DETAILED DESCRIPTION

As mentioned above, over time, the level or amount of printable fluid within the reservoir is depleted as the printing device utilizes the printable fluid. A number of devices may be used to sense and determine the level or amount of printable fluid within the reservoir of printable fluid. In some examples, the devices used to sense and determine the amount of printable fluid within the reservoir may be complex and expensive to manufacture.

False printable fluid levels or inaccurate readouts causes consumers of printable fluid devices to be dissatisfied with such a product. More reliable and accurate fluid level sensors may cause a consumer base to have a better user experience. Thus, it is desirable to accurately measure the level of ink in a container at a minimal cost to the manufacturer and the end consumer. Using a silicon die as a sensing device is one method to detect a level or amount of printable fluid. However, silicon is a relatively expensive material, and it is also desirable to make the printable fluid level sensor as small of a device as possible. It may also be desirable to have as simple of a data communication protocol as possible, and for the printable fluid level sensor to communicate information to a printer controller or other processing device within a printing device via digital signals, rather than analog signals.

As used in the present specification and in the appended claims, the term "a number of" or similar language is meant to be understood broadly as any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1A:
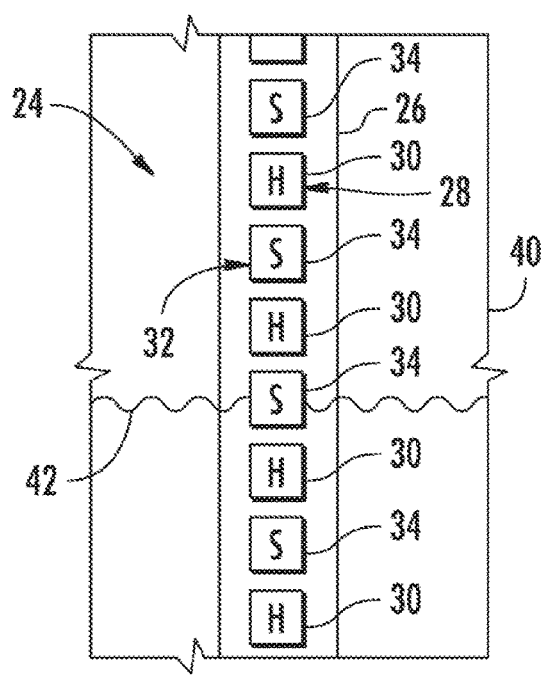
FIG. 1A is a diagram of a portion of an example liquid interface for an example fluid level sensor, according to one example of the principles described herein.
Figure 1B:
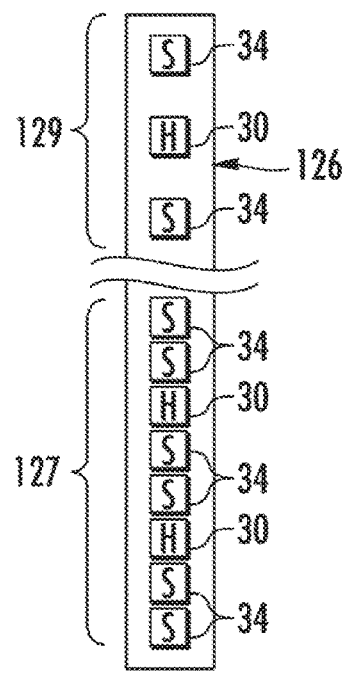
FIG. 1B is a diagram of portions of another example liquid interface for an example fluid level sensor, according to one example of the principles described herein.

Turning now to the figures, FIG. 1 illustrates an example liquid level sensing interface (24) for a fluid level sensor. Liquid interface (24) interacts with liquid within a volume (40) and outputs signals that indicate the current level of liquid within the volume (40). Such signals are processed to determine the level of liquid within the volume (40). Liquid interface (24) facilitates the detection of the level of liquid within the volume (40) in a low-cost manner.

As schematically shown by FIG. 1, liquid interface (24) includes strip (26), a series (28) of heating elements (30) and a series (32) of sensors (34). The strip (26) includes an elongated strip that is to be extended into volume (40) containing the liquid (42). The strip (26) supports heating elements (30) and sensors (34) such that a subset of the heating elements (30) and the sensors (34) are submersed within the liquid (42), when the liquid (42) is present.

In one example, the strip (26) is supported from the top or from the bottom such that those portions of the strip (26), and their supported heating elements (30) and sensors (34), submersed within the liquid (42), are completely surrounded on all sides by the liquid (42). In another example, the strip (26) is supported along a side of the volume (40) such that a face of the strip (26) adjacent the side of the volume (40) is not opposed by the liquid (42). In one example, the strip (26) includes an elongated rectangular, substantially flat strip. In another example the strip (26) includes a strip including a different polygon cross-section or a circular or oval cross-section.

The heating elements (30) include individual heating elements spaced along a length of the strip (26). Each of the heating elements (30) is sufficiently close to a sensor (34) such that the heat emitted by the individual heating element may be sensed by the associated sensor (34). In one example, each heating element (30) is independently actuatable to emit heat independent of other heating elements (30). In one example, each heating element (30) includes an electrical resistor. In one example, each heating element (30) is emits a heat pulse for a duration of at least 10 μs with a power of at least 10 mW.

In the example illustrated, the heating elements (30) are employed to emit heat and do not serve as temperature sensors. As a result, each of the heating elements (30) may be constructed from a wide variety of electrically resistive materials including a wide range of temperature coefficient of resistance. A resistor may be characterized by its temperature coefficient of resistance, or TCR. The TCR is the resistor's change in resistance as a function of the ambient temperature. TCR may be expressed in ppm/° C., which stands for parts per million per centigrade degree. The temperature coefficient of resistance is calculated as follows:

temperature coefficient of a resistor: $TCR=(R2-R1)$
$e-6/R1*(T2-T1)$, where TCR is in ppm/° C., R1 is in ohms at room temperature, R2 is resistance at operating temperature in ohms, T1 is the room temperature in ° C. and T2 is the operating temperature in ° C.

Because the heating elements (30) are separate and distinct from the temperature sensors (34), a wide variety of thin-film material choices are available in wafer fabrication processes for forming the heating elements (30). In one example, each of the heating elements (30) has a relatively high heat dissipation per area, high temperature stability (TCR<1000 ppm/° C.), and the intimate coupling of heat generation to the surrounding medium and heat sensor. Suitable materials can be refractory metals and their respective alloys such as tantalum, and its alloys, and tungsten, and its alloys, to name a few; however, other heat dissipation devices like doped silicon or polysilicon may also be used.

The sensors (34) include individual sensing elements spaced along the length of the strip (26). Each of the sensors (34) is sufficiently close to a corresponding heating element (30) such that the sensor (34) may detect or respond to the transfer of heat from the associated or corresponding heating element (30). Each of the sensors (34) outputs a signal which indicates or reflects the amount of heat transmitted to the particular sensor (34) following and corresponding to a pulse of heat from the associated heating element. The amount of heat transmitted by the associated heating element will vary depending upon the medium through which the heat was transmitted prior to reaching the sensor (34). Liquid (42) has a higher heat capacity than air (41). Thus, the liquid (42) will reduce the temperature detected by sensor (34) differently with respect to the air (41). As a result, the differences between signals from sensors (34) indicate the level of the liquid (42) within the volume (40).

In one example, each of the sensors (34) includes a diode which has a characteristic temperature response. For example, in one example, each of the sensors (34) includes a P-N junction diode. In other examples, other diodes may be employed or other temperature sensors may be employed.

In the example illustrated, the heating elements (30) and the sensors (34) are supported by the strip (26) so as to be interdigitated or interleaved amongst one another along the length of the strip (26). For purposes of this disclosure, the term "support" or "supported by" with respect to heating elements and/or sensors and a strip means that the heating elements and/or sensors are carried by the strip such that the strip, heating elements, and sensors form a single connected unit. Such heating elements and sensors may be supported on the outside or within and interior of the strip. For purposes of this disclosure, the term "interdigitated" or "interleaved" means that two items alternate with respect to one another. For example, interdigitated heating elements and sensors may include a first heating element, followed by a first sensor, followed by a second heating element, followed by a second sensor and so on.

In one example, an individual heating element (30) may emit pulses of heat that are to be sensed by multiple sensors (34) proximate to the individual heating element (30). In one example, each sensor (34) is spaced no greater than 20 μm from an individual heating element (30). In one example, the sensors (34) have a minimum one-dimensional density along strip (24) of at least 100 sensors (34) per inch (at least 40 sensors (34) per centimeter). The one dimensional density includes a number of sensors per unit measure in a direction along the length of the strip (26), the dimension of the strip (26) extending to different depths, defining the depth or liquid level sensing resolution of the liquid interface (24). In other examples, the sensors (34) have other one dimensional densities along the strip (24). For example, the sensors (34) have a one-dimensional density along the strip (26) of at least 10 sensors (34) per inch. In other examples, the sensors (34) may have a one-dimensional density along the strip (26) on the order of 1000 sensors per inch (400 sensors (34) per centimeter) or greater.

In some examples, the vertical density or number of sensors per vertical centimeter or inch may vary along the vertical or longitudinal length of the strip (26). FIG. 1A illustrates an example sensor strip (126) including a varying density of sensors (34) along its major dimension or launching a length. In the example illustrated, the sensor strip (126) has greater density of sensors (34) in those regions along the vertical height or depth may benefit more from a greater degree of depth resolution. In the example illustrated, the sensor strip (126) has a lower portion (127) including a first density of sensors (34) and an upper portion (129) including a second density of sensors (34), the second density being less than the first density. In such an example, the sensor strip (126) provides a higher degree of accuracy or resolution as the level of the liquid within the volume approaches an empty state. In one example, the lower portion (127) has a density of at least (40) sensors (34) per centimeter while upper portion (129) has a density of less than 10 sensors per centimeter, and in one example, 4 sensors (34) per centimeter. In yet other examples, an upper portion or a middle portion of the sensor strip (126) may alternatively have a greater density of sensors as compared to other portions of the sensor strip (126).

Each of the heating elements (30) and each of the sensors (34) are selectively actuatable under the control of a controller. In one example, the controller is part of or carried by the strip (26). In another example, the controller includes a remote controller electrically connected to the heating elements (30) on the strip (26). In one example, the interface (24) includes a separate component from the controller, facilitating replacement of the interface (24) or facilitating the control of multiple interfaces (24) by a separate controller.

Figure 2:
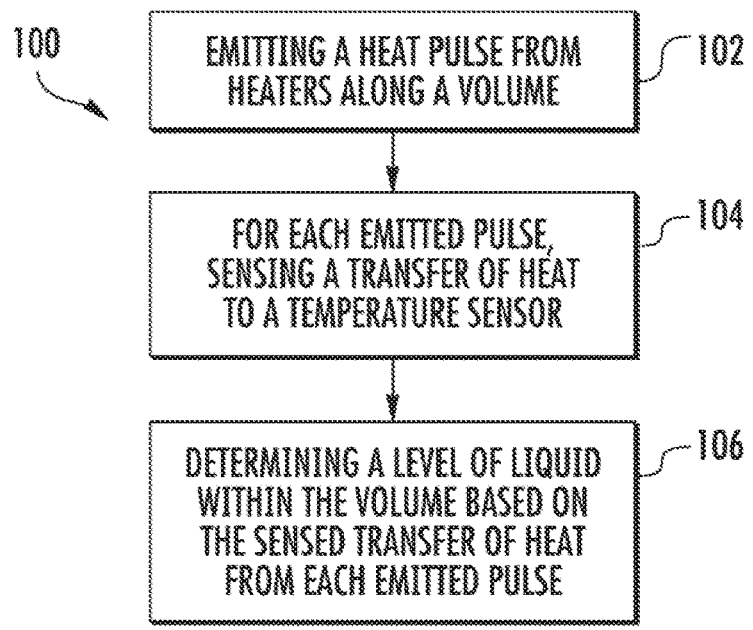
FIG. 2 is a flow diagram of an example method for determining a level of liquid using the fluid level sensor of the FIG. 1, according to one example of the principles described herein.

FIG. 2 is a flow diagram of an example method (100) that may be carried out using a liquid interface, such as the liquid interface (24), to sense and determine the level of a liquid within a volume. As indicated by block 102, control signals are sent to heating elements (30) causing a subset of the heating elements (30) or each of the heating elements (30) to turn on and off so as to emit a heat pulse. In one example, control signals are sent to the heating elements (30) such that the heating elements (30) are sequentially actuated or turned on and off (pulsed) to sequentially emit pulses of heat. In one example, the heating elements (30) are sequentially turned on and off, for example, in order from top to bottom along the strip (26) or from bottom to top along the strip (26).

In another example, the heating elements (30) are actuated based upon a search algorithm, wherein the controller identifies which of the heating elements (30) should be initially pulsed in an effort to reduce the total time or the total number of heating elements (30) that are pulsed to determine the level of liquid (42) within volume (40). In one example, the identification of what heating elements (30) are initially pulsed is based upon historical data. For example, in one example, the controller consults a memory to obtain data regarding the last sensed level of liquid (42) within the volume (40) and pulses those heating elements (30) most proximate to the last sensed level of the liquid (42) before pulsing other heating elements (30) more distant from the last sensed level of the liquid (42).

In another example, the controller predicts the current level of the liquid (42) within the volume (40) based upon the obtained last sensed level of the liquid (42) and pulses those heating elements (30) proximate to the predicted current level of the liquid (42) within the volume (40) pulsing other heating elements (30) more distant from the predicted current level of the liquid (42). In one example, the predicted current level of the liquid (42) is based upon the last sensed level of the liquid (42) and a lapse of time since the last sensing of the level of the liquid (42). In another example, the predicted current level of the liquid (42) is based upon the last sensed level of the liquid (42) and data indicating the consumption or withdrawal of the liquid (42) from the volume (40). For example, in circumstances where the liquid interface (42) is sensing the volume (40) of an ink in an ink supply, the predicted current level of liquid (42) may be based upon a last sensed level of the liquid (42) and data such as the number of pages printed using the ink or the like.

In yet another example, the heating elements (30) may be sequentially pulsed, wherein the heating elements (30) proximate to a center of the depth range of volume (40) are initially pulsed and wherein the other heating elements (30) are pulsed in the order based upon their distance from the center of the depth range of volume (40). In yet another example, subsets of heating elements (30) are concurrently pulsed. For example, a first heating element and a second heating element may be concurrently pulsed where the first heating element and the second heating element are sufficiently spaced from one another along strip (26) such that the heat emitted by the first heating element is not transmitted or does not reach the sensor intended to sense transmission of heat from the second heating element. Concurrently pulsing heating elements (30) may reduce the total time for determining the level of the liquid (42) within the volume (40).

In one example, each heat pulse has a duration of at least 10 μs and has a power of at least 10 mW. In one example, each heat pulse has a duration of between 1 and 100 μs and up to a millisecond. In one example, each heat pulse has a power of at least 10 mW and up to and including 10 W.

As indicated by block 104 in FIG. 2, for each emitted pulse, an associated sensor (34) senses the transfer of heat from the associated heating element to the associated sensor (34). In one example, each sensor (34) is actuated, turned on or polled following a predetermined period of time after the pulse of heat from the associated heating element. The period of time may be based upon the beginning of the pulse, the end of the pulse or some other time value related to the timing of the pulse. In one example, each sensor (34) senses heat transmitted from the associated heating element (30) beginning at least 10 μs following the end of the heat pulse from the associated heating element (30). In one example, each sensor (34) senses heat transmitted from the associated heating element (30) beginning at 1000 μs following the end of the heat pulse from the associated heating element (30). In another example, sensor (34) initiates the sensing of heat after the end of the heat pulse from the associated heating element following a period of time equal to a duration of the heat pulse, wherein such sensing occurs for a period of time of between two to three times the duration of the heat pulse. In yet other examples, the time delay between the heat pulse and the sensing of heat by the associated sensor (34) may have other values.

As indicated by block 106 in FIG. 2, the controller or another controller determines a level of the liquid (42) within the volume (40) based upon the sensed transfer of heat from each emitted pulse. For example, the liquid (42) has a higher heat capacity than air (41). Thus, the liquid (34) may reduce the temperature detected by sensor (34) differently with respect to the air (41). If the level of the liquid (42) within the volume (40) is such that liquid is extending between a particular heating element (30) and its associated sensor (34), heat transfer from the particular heating element (32) to the associated sensor (34) will be less as compared to circumstances where air (41) is extending between the particular heating element (30) and its associated sensor (34). Based upon the amount of heat sensed by the associated sensor (34) following the emission of the heat pulse by the associated heating element (30), the controller determines whether air or liquid is extending between the particular heating element (30) and the associated sensor. Using this determination and the known location of the heating element (30) and/or sensor (34) along the strip (26) and the relative positioning of the strip (26) with respect to the floor of the volume (40), the controller determines the level of the liquid (42) within the volume (40). Based upon the determined level of the liquid (42) within the volume (40) and the characteristics of the volume (40), the controller is further able to determine the actual volume or amount of liquid remaining within the volume (40).

In one example, the controller determines the level of liquid within the volume (40) by consulting a lookup table stored in a memory, wherein the lookup table associates different signals from the sensors (34) with different levels of liquid within the volume (40). In yet another example, the controller determines the level of the liquid (42) within the volume (40) by utilizing signals from the sensors (34) as input to an algorithm or formula.

In some examples, method 100 and the liquid interface (24) may be used to not only determine an uppermost level or top surface of the liquid (42) within the volume (40), but also to determine different levels of different liquids concurrently residing in the volume (40). For example, due to different densities or other properties, different liquids may layer upon one another while concurrently residing in a single volume (40). Each of such different liquids may have a different heat transfer characteristic. In such an application, method 100 and liquid interface (24) may be used to identify where the layer of a first liquid ends within volume (40) and where the layer of a second different liquid, underlying or overlying the first liquid, begins.

In one example, the determined level (or levels) of liquid within the volume (40) and/or the determined volume or amount of liquid within volume (40) is output through a display or audible device. In yet other examples, the determined level of liquid or the volume of liquid is used as a basis for triggering an alert, warning or the like to user. In some examples, the determined level of liquid or volume of liquid is used to trigger the automatic reordering of replenishment liquid or the closing of a valve to stop the inflow of liquid into the volume (40). For example, in printers, the determined level of liquid within volume (40) may automatically trigger reordering of the replacement ink cartridge or replacement ink supply.

Figure 3:
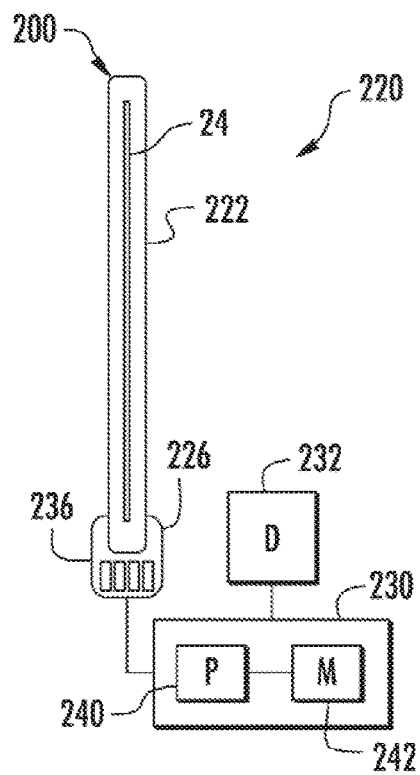
FIG. 3 is a diagram of an example liquid level sensing system, according to one example of the principles described herein.

FIG. 3 illustrates an example liquid level sensing system (220), Liquid level sensing system (220) includes a carrier (222), the liquid interface (24) described above, an electoral interconnect (226), a controller (230) and a display (232). The carrier (222) includes a structure that supports the strip (26). In one example, the carrier (222) includes a strip (26) formed from, or that includes, a polymer, glass or other material. In one example, the carrier (222) has embedded electrical traces or conductors. For example, the carrier (222) includes composite material composed of woven fiberglass cloth with an epoxy resin binder. In one example, the carrier (222) includes a glass-reinforced epoxy laminate sheet, tube, rod, or printed circuit board.

Liquid interface (24), described above, extends along a length of the carrier (222). In one example, the liquid interface (24) is glued, bonded or otherwise affixed to the carrier (222). In some examples, depending upon the thickness and strength of the strip (26), the carrier (222) may be omitted.

The electrical interconnect (226) includes an interface by which signals from the sensors (34) of interface (24) as depicted in FIG. 1 are transmitted to the controller (230). In one example, the electrical interconnect (226) includes electrical contact pads (236). In other examples, the electrical interconnect (226) may have other forms. The electrical interconnect (226), the carrier (222) and the strip (24), collectively, form a fluid level sensor (200) that may be incorporated into and fixed as part of a liquid container volume or may be a separate portable sensing device which may be temporarily manually inserted into different liquid containers or volumes.

The controller (230) includes a processing unit (240) and associated non-transient computer-readable medium or memory (242). In one example, the controller (230) is separate from fluid level sensor (200). In other examples, controller (230) is incorporated as part of the sensor (200). Processing unit (240) files instructions contained in memory (242). For purposes of this application, the term "processing unit" shall mean a presently developed or future developed processing unit that executes sequences of instructions contained in a memory. Execution of the sequences of instructions causes the processing unit to generate control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, the controller (230) may be embodied as part of at least one application-specific integrated circuits (ASICs). Unless otherwise specifically noted, the controller (230) is not limited to any specific combination of hardware circuitry and software, nor to any particular source for the instructions executed by the processing unit.

The processing unit (240), following instructions contained in the memory (242), carries out the method (100) shown and described above with respect to FIG. 2. The processor (240), following instructions provided in the memory (242), selectively pulses the heating elements (30). The processor (240), following instructions provided in the memory (242), obtains data signals from the sensors (34), or in the data signals indicate dissipation of heat from the pulses and the transfer of heat to the sensors (34). Processor (240), following instructions provided in memory (242), determines a level of liquid (42) within the volume (40) based upon the signals from the sensors (34). As noted above, in some examples, the controller (230) may additionally determine an amount or volume of liquid (42) using characteristics of the volume (40) or chamber containing the liquid (42).

In one example, the display (232) receives signals from the controller (230), and presents visible data based upon the determined level of liquid (42) and/or determined volume or amount of liquid (42) within the volume (40). In one example, display (232) presents an icon or other graphic depicting a percentage of the volume (40) that is filled with the liquid (42). In another example, the display (232) presents an alphanumeric indication of the level of liquid (42) or percent of the volume (40) that is filled with the liquid (42) or that has been emptied of the liquid (42). In yet another example, the display (232) presents an alert or "acceptable" status based on the determined level of the liquid (42) within the volume (40). In yet other examples, the display (232) may be omitted, wherein the determined level of liquid within the volume is used to automatically trigger an event such as the reordering of replenishment liquid, the actuation of a valve to add a liquid to the volume or the actuation of the valve to terminate the ongoing addition of liquid (42) to the volume (40).

Figure 4:
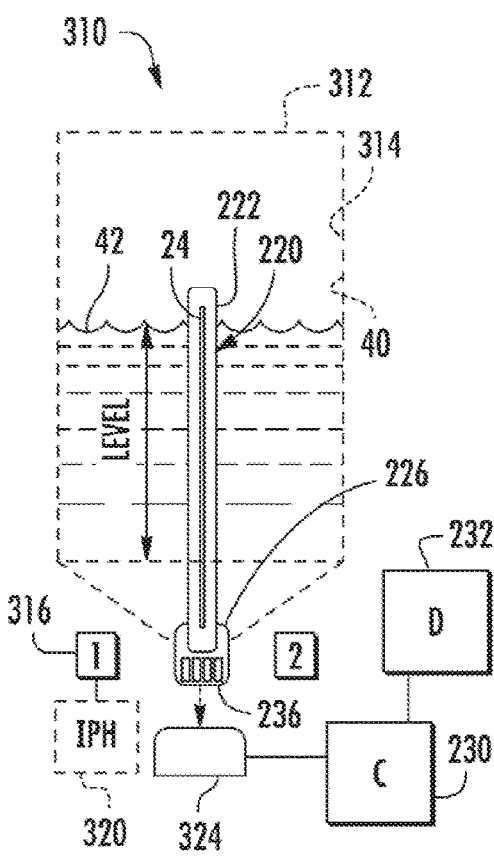
FIG. 4 is a diagram of an example liquid supply system including the liquid level sensing system of FIG. 3, according to one example of the principles described herein.

FIG. 4 is a sectional view illustrating a liquid level sensing system (220) incorporated as part of a liquid supply system (310). The liquid supply system (310) includes a liquid container (312), a chamber (314) and a fluid or liquid ports (316). The container (312) defines the chamber (314). The chamber (314) forms an example volume (40) in which the liquid (42) is contained. As shown by FIG. 4, the carrier (222) and the liquid interface (24) project into the chamber (314) from a bottom side of the chamber (314), facilitating liquid level determinations as the chamber (314) nears a state of being completely empty. In other examples, the carrier (222) of the liquid interface (24) may alternatively be suspended from a top of the chamber (314).

The liquid ports (316) include liquid passes by which liquid from within the chamber (314) is delivered and directed to an external recipient. In one example, the liquid ports (316) include a valve or other mechanism facilitating selective discharge of liquid from the chamber (314). In one example, the liquid supply system (310) includes an off-axis ink supply for a printing system. In another example, the liquid supply system (310) additionally includes a print head (320) which is fluidly coupled to the chamber (314) to receive the liquid (42) from the chamber (314) through the liquid interface (316). In one example, the liquid supply system (310), including the print head (320), may form a print cartridge. For purposes of this disclosure, the term "fluidly coupled" means that two or more fluid transmitting volumes are connected directly to one another or are connected to one another by intermediate volumes or spaces such that fluid may flow from one volume into the other volume.

In the example illustrated in FIG. 4, communication between the controller (230), which is remote or separate from liquid supply system (310), is facilitated via a wiring connector (324) such as a universal serial bus connector or other type of connector. The controller (230) and the display (232) operate as described above.

Figure 5:
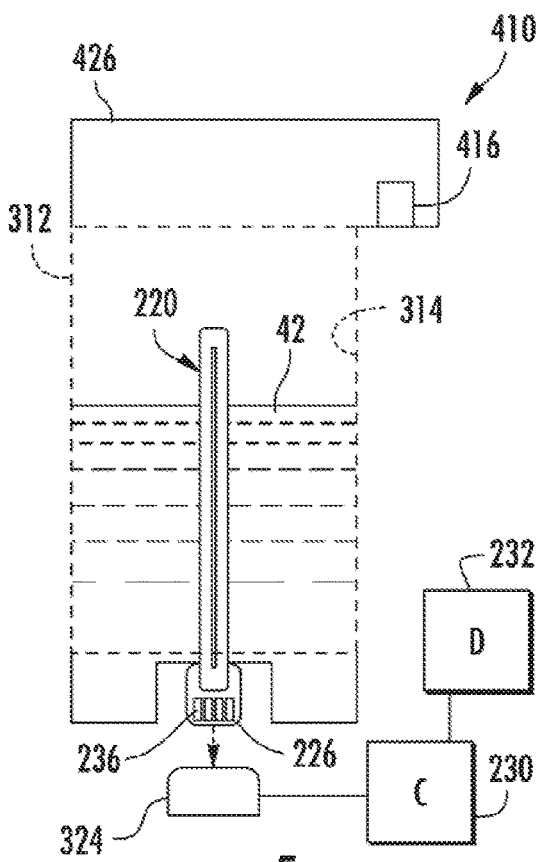
FIG. 5 diagram of another example liquid supply system including the liquid level sensing system of FIG. 3, according to one example of the principles described herein.

FIG. 5 is a sectional view illustrating a liquid supply system (410); another example of the liquid supply system (310). The liquid supply system (410) is similar to the liquid supply system (310) except that the liquid supply system (410) includes a liquid port (416) in place of the liquid port (316). The liquid port (416) is similar to the interface of the liquid port (316) except that the liquid port (416) is provided in a cap (426) above the chamber (314) of the container (312). Those remaining components of system (410) which correspond to components of system (310) are numbered similarly.

Figure 6:
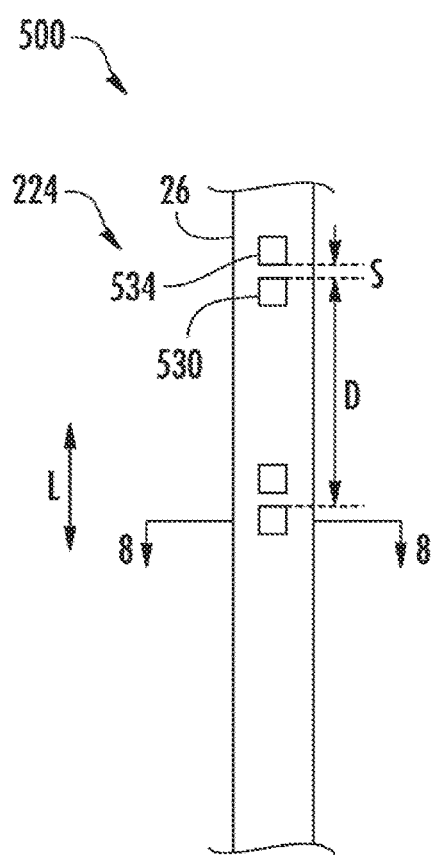
FIG. 6 is a diagram of a portion of another example liquid interface of a fluid level sensor, according to one example of the principles described herein.
Figure 7:
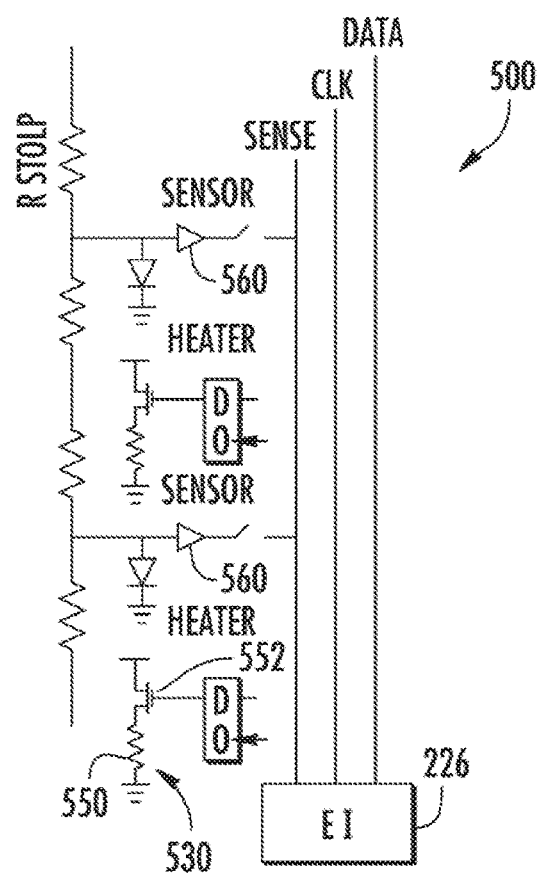
FIG. 7 is an example circuit diagram of the fluid level sensor of FIG. 6, according to one example of the principles described herein.
Figure 8:
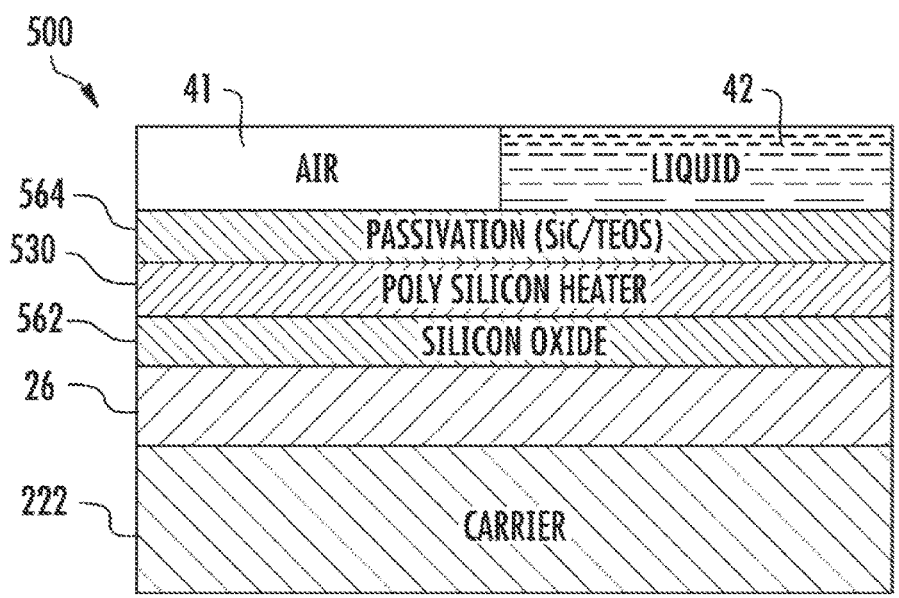
FIG. 8 is a sectional view of the example liquid interface of FIG. 6, according to one example of the principles described herein.

FIGS. 6-8 illustrate a fluid level sensor (500); another example of the fluid level sensor (200) of FIG. 2. FIG. 6 is a diagram illustrating a portion of the liquid interface (224). FIG. 7 is a circuit diagram of a sensor (500). FIG. 8 is a sectional view through a liquid interface (224) of FIG. 6 taken along lines 8-8. As shown by FIG. 6, the liquid interface (224) is similar to the liquid interface (24) described above in connection with FIG. 1 in that the liquid interface (224) includes a strip (26) which supports a series of heating elements (530) and a series of temperature sensors (534). In the example illustrated, the heating elements (530) and the temperature sensors (534) are interdigitated or interleaved along the length (L) of the strip (26). The length (L) is the major dimension of the strip (26) that extends across different depths when the sensor (500) is being used. In the example illustrated, each sensor (534) is spaced from its associated or corresponding heating element (530) by a spacing distance (S), as measured in a direction along the length (L), of less than or equal to 20 µm and nominally 10 µm. In the example illustrated, the sensors (534) and their associated heating elements (530) are arranged in pairs, wherein the heating elements (530) of adjacent pairs are separated from one another by a distance (D), as measured in a direction along the length (L), of at least 25 µm to reduce thermal cross talk between consecutive heating elements. In one example, consecutive heating elements (530) are separated from one another by a distance (D) of between 25 µm and 2500 µm, and nominally 100 µm.

As depicted in FIG. 7, each heating element (530) includes an electrical resistor (550) which may selectively turn on and off through the selective actuation of a transistor (552). Each sensor (534) includes a diode (560). In one example, the diode (560), serving as temperature sensors, includes a P-N junction diode. Each diode (550) has a characteristic response to changes in temperature. In particular, each diode (550) has a forward voltage that changes in response to changes in temperature. The diode (550) exhibits a nearly linear relationship between temperature and applied voltage. Because the temperature sensors (530) include diodes or semiconductor junctions, the sensor (500) has a lower cost and can be fabricated upon the strip (26) using semiconductor fabrication techniques.

FIG. 8 is a sectional view of a portion of one example of the sensor (500). In the example illustrated, the strip (26) is supported by the carrier (222) as described above. In one example, the strip (26) includes silicon while the carrier (222) includes a polymer or plastic. In the example illustrated, the heating element (530) includes a polysilicon heating element which is supported by the strip (26), but separated from the strip (26) by an electrical insulating layer (562), such as a layer of silicon dioxide. In the example illustrated, the heating element (530) is further encapsulated by an outer passivation layer (564) which inhibits contact between the heating element (530) and the liquid being sensed. the passivation layer (564) protects the heating elements (530) and the sensors (534) from damage that would otherwise result from corrosive contact with the liquid or ink being sensed. In one example, the outer passivation layer (564) includes silicon carbide and/or tetraethyl orthosilicate (TEOS). In other examples, layers (562) and (564) may be omitted or may be formed from other materials.

As shown by FIGS. 7 and 8, the construction of the sensor (500) creates various layers or barriers providing additional thermal resistances (R). The pulse of heat emitted by the heating element (530) is transmitted across such thermal resistances to the associated sensor (534). The rate at which the heat from a particular heating element (530) is transmitted to the associated sensor (534) varies depending upon whether the particular heating element (530) is bordered by air (41) or a liquid (42). Signals from the sensor (534) will vary depending upon whether they were transmitted across air (41) or liquid (42). Different signals are used to determine the current level of the liquid (42) within a volume (40).

Figures 9A, 9B, 9C, 10:
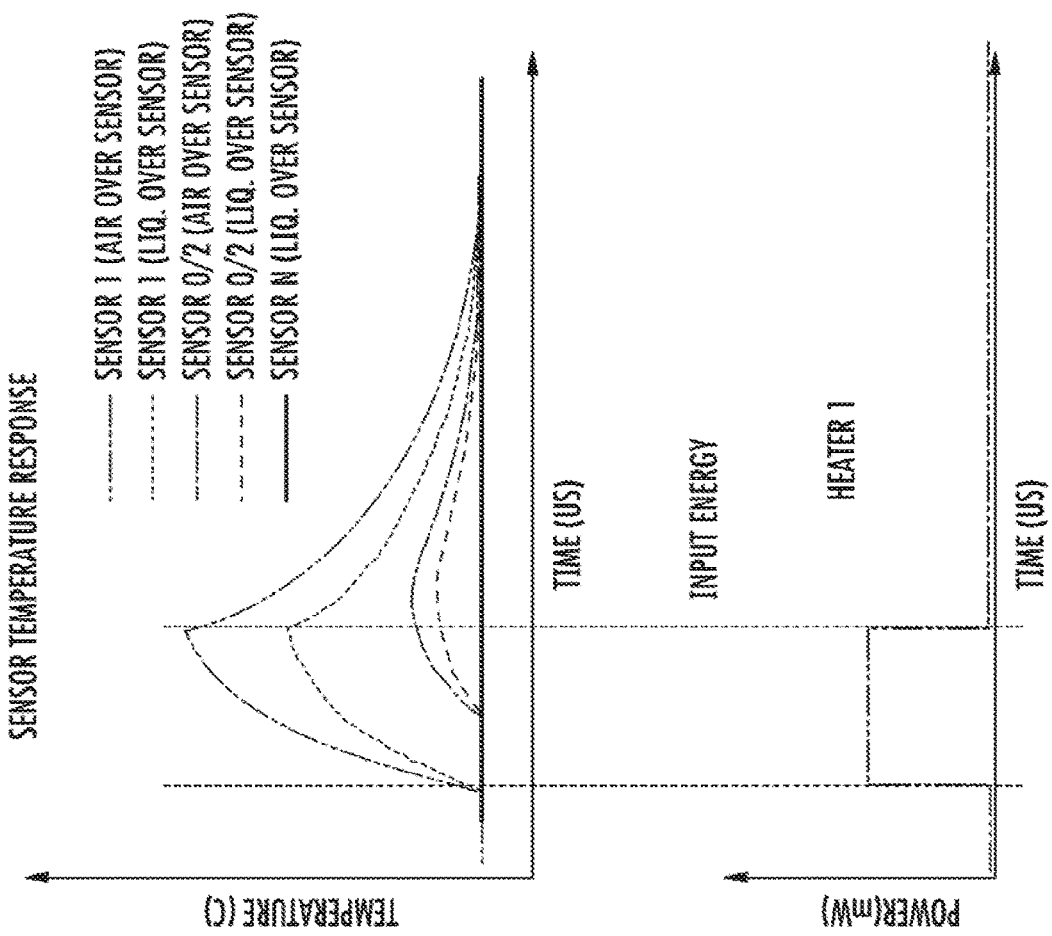
FIG. 9A is a fragmentary front view of the fluid level sensor of FIG. 6, illustrating an example heat spike resulting from the pulsing of a heater, according to one example of the principles described herein.
FIG. 9B is a fragmentary front view of another example fluid level sensor, illustrating an example heat spike resulting from the pulsing of a heater, according to one example of the principles described herein.
FIG. 9C is a sectional view of the example fluid level sensor of FIG. 9B, illustrating the example heat spike resulting from the pulsing of the heater, according to one example of the principles described herein.
FIG. 10 is a graph illustrating an example of different sensed temperature responses over time to a heater impulse, according to one example of the principles described herein.

FIGS. 9A, 9B and 9C illustrate liquid interfaces (624) and (644); other examples of the liquid interface (24). In FIG. 9A, heating elements and sensors are arranged in pairs labeled 0, 1, 2, . . . N. The liquid interface (624) is similar to the liquid interface (24) of FIG. 1 except that rather than being interleaved or interdigitated vertically along the length of the strip (26), the heating elements (30) and the sensors (34) are arranged in an array of side-by-side pairs vertically along the length of the strip (26).

FIGS. 9B and 9C illustrate a liquid interface (644): another example of the liquid interface (24) of FIG. 1. The liquid interface (644) is similar to the liquid interface (24) of FIG. 1 except that the heating elements (30) and sensors (34) are arranged in an array of stacks vertically spaced along the length of strip (26). FIG. 9C is a sectional view of the interface (644) further illustrating the stacked arrangement of the pairs of heating elements (30) and sensors (34).

FIGS. 9A-9C additionally illustrate an example of pulsing of the heating element (30) of the heating element/sensor pair (1), and the subsequent dissipation of heat through the adjacent materials. In FIGS. 9A-9C, the temperature or intensity of the heat dissipates or declines as the heat travels further away from the source of the heat, i.e., the heating element (30) of heating element/sensor pair (1). The dissipation of heat is illustrated by the change of crosshatching in FIGS. 9A through 9C.

FIG. 10 illustrates a pair of time synchronized graphs of the example pulsing shown in FIGS. 9A-9C. FIG. 10 illustrates the relationship between the pulsing of the heating element (30) of the heating element sensor pair (1) and the response over time by sensors (34) of the heating element/sensor pairs (0, 1, 2, . . . N). As shown by FIG. 10, the response of each of the sensors (34) of each pair (0, 1, 2, . . . N) varies depending upon whether air or liquid is over or adjacent to the respective heating element/sensor pair (0, 1, 2, . . . N). The characteristic transient curve and magnitude scale are different in the presence of air versus in the presence of liquid. As a result, signals from interface (644), as well as other interfaces such as interfaces (24) and (624), indicate the level of liquid within the volume.

In one example, a controller, such as the controller (230) described above, determines a level of liquid within the sensed volume by individually pulsing the heating element (30) of a pair of heating elements/sensors, and compares the magnitude of the temperature, as sensed from the sensor of the same pair, relative to the heating element pulsing parameters to determine whether liquid or air is adjacent to the individual heating element/sensor pair. The controller (230) carries out such pulsing and sensing for each pair of the array until the level of the liquid within the sensed volume is found or identified. For example, controller (230) may first pulse heating element (30) of pair (0) and compare the sensed temperature provided by sensor (34) of pair (0) to a predetermined threshold. Thereafter, controller (30) may pulse heating element (30) of pair (1) and compare the sensed temperature provided by sensor (34) of pair (1) to a predetermined threshold. This process is repeated until the level of the liquid is found or identified.

In another example, a controller, such as controller (230) described above, determines a level of liquid within the sensed volume by individually pulsing the heating element (30) of a pair and comparing multiple magnitudes of temperature as sensed by the sensors of multiple pairs. For example, controller (230) may pulse the heating element (30) of pair (1) and thereafter compare the temperature sensed by sensor (34) of pair (1), the temperature sensed by sensor (34) of pair (0), the temperature sensed by sensor (34) of pair (2), and so on, each temperature resulting from the pulsing of the heating element (30) of pair (1). In one example, the controller (230) may utilize the analysis of the multiple magnitudes of temperature from the different sensors (34) vertically along the liquid interface, resulting from a single pulse of heat, to determine whether liquid or air is adjacent to the heating element sensor pair including the heating element that was pulsed. In such an example, the controller (230) carries out such pulsing and sensing by separately pulsing the heating element of each pair of the array and analyzing the resulting corresponding multiple different temperature magnitudes until the level of the liquid (42) within the sensed volume (40) is found or identified.

In another example, the controller (230) may determine the level of the liquid (42) within the sensed volume (40) based upon the differences in the multiple magnitudes of temperature vertically along the liquid interface resulting from a single heat pulse. For example, if the magnitude of temperature of a particular sensor (34) drastically changes with respect to the magnitude of temperature of an adjacent sensor (34), the drastic change may indicate that the level of liquid (42) is at or between the two sensors (34). In one example, the controller (230) may compare differences between the temperature magnitudes of adjacent sensors (34) to a predefined threshold to determine whether the level of the liquid (42) is at or between the known vertical locations of the two sensors (34).

In yet other examples, a controller, such as controller (230) described above, determines the level of the liquid (42) within the sensed volume (40) based upon the profile of a transient temperature curve based upon signals from a single sensor (34) or multiple transient temperature curves based upon signals from multiple sensors (34). In one example, a controller, such as controller (230) described above, determines a level of liquid (42) within the sensed volume (40) by individually pulsing the heating element (30) of a pair (0, 1, 2, . . . N) and comparing the transient temperature curve produced by the sensor of the same pair (0, 1, 2, . . . N), relative to the predefined threshold or a predefined curve to determine whether liquid (42) or air (41) is adjacent to the individual heating element/sensor pair (0, 1, 2, . . . N). The controller (230) carries out such pulsing and sensing for each pair (0, 1, 2, . . . N) of the array until the level of the liquid (42) within the sensed volume (40) is found or identified. For example, controller (230) may first pulse heating element (30) of pair (0) and compare the resulting transient temperature curve produced by sensor (34) of pair (0) to a predetermined threshold or predefined comparison curve. Thereafter, the controller (230) may pulse heating element (30) of pair (1) and compare the resulting transient temperature curve produced by the sensor (34) of pair (1) to a predetermined threshold or predefined comparison curve. This process is repeated until the level of the liquid (42) is found or identified.

In another example, a controller, such as controller (230) described above, determines a level of the liquid (42) within the sensed volume (40) by individually pulsing the heating element (30) of a pair (0, 1, 2, . . . N) and comparing multiple transient temperature curves produced by the sensors (43) of multiple pairs (0, 1, 2, . . . N). For example, the controller (230) may pulse the heating element (30) of pair (1) and thereafter compare the resulting transient temperature curve produced by the sensor (34) of pair (1), the resulting transient temperature curve produced by the sensor (34) of pair (0), the resulting transient temperature curve produced by the sensor (34) of pair (2), and so on, each transient temperature curve resulting from the pulsing of the heating element (30) of pair (1). In one example, the controller (230) may utilize the analysis of the multiple transient temperature curves from the different sensors (34) vertically along the liquid interface, resulting from a single pulse of heat, to determine whether liquid (42) or air (41) is adjacent to the heating element sensor pair (0, 1, 2, . . . N) including the heating element (30) that was pulsed. In such an example, the controller (230) carries out such pulsing and sensing by separately pulsing the heating element (30) of each pair (0, 1, 2, . . . N) of the array and analyzing the resulting corresponding multiple different transient temperature curves until the level of the liquid (42) within the sensed volume (40) is found or identified.

In another example, the controller (230) may determine the level of liquid (42) within the sensed volume (40) based upon the differences in the multiple transient temperature curves produced by different sensors (34) vertically along the liquid interface resulting from a single heat pulse. For example, if the transient temperature curve of a particular sensor (34) drastically changes with respect to the transient temperature curve of an adjacent sensor (34), the drastic change may indicate that the level of liquid (42) is at or between the two sensors (34). In one example, the controller (230) may compare differences between the transient temperature curves of adjacent sensors (34) to a predefined threshold to determine whether the level of the liquid (42) is at or between the known vertical locations of the two sensors (0, 1, 2, . . . N).

Figure 12:
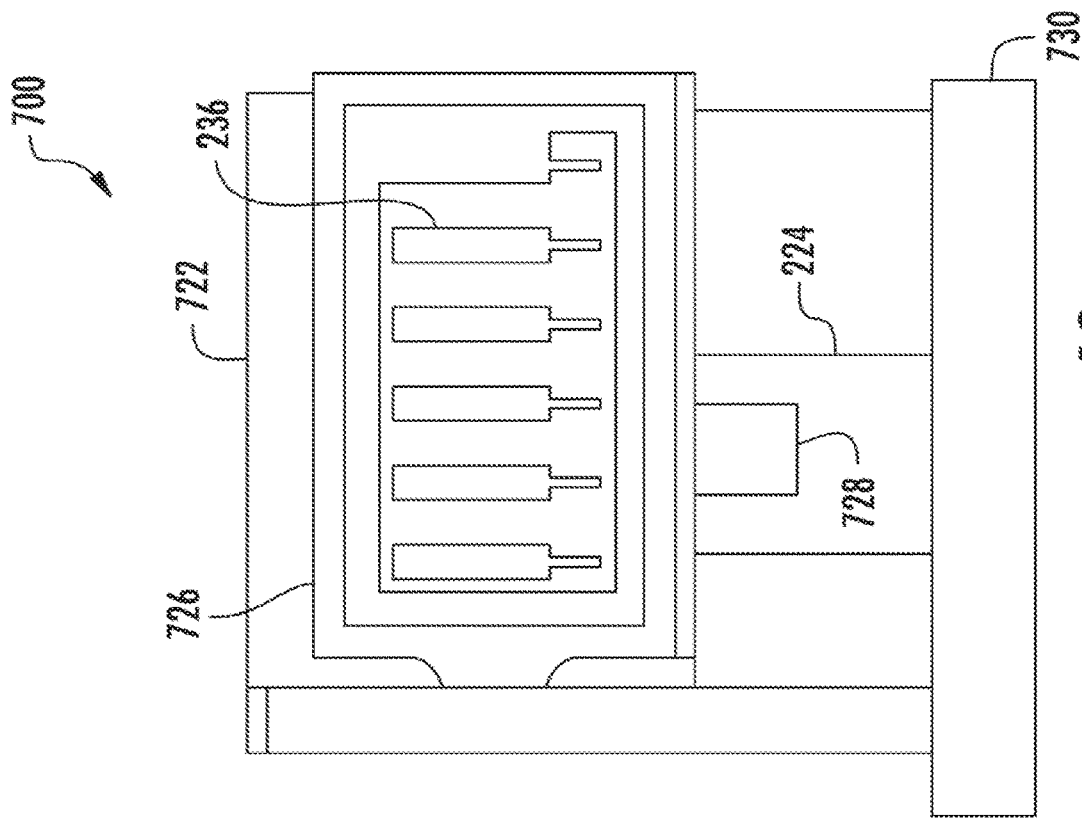
FIG. 12 is an enlarged view of a portion of the example fluid level sensor of FIG. 11, according to one example of the principles described herein.
Figure 11:
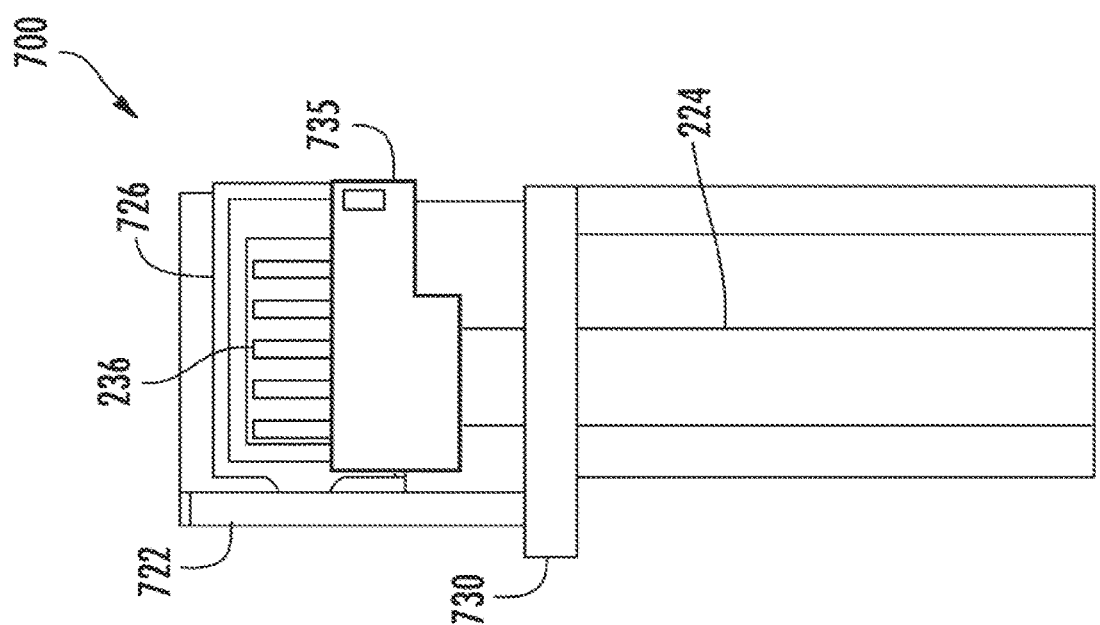
FIG. 11 is a diagram of another example fluid level sensor, according to one example of the principles described herein.

FIGS. 11 and 12 illustrate a sensor (700); an example of sensor (500) of FIGS. 6-8. The sensor (700) includes a carrier (722), a liquid interface (224), an electrical interface (726), a driver (728), and a collar (730). The carrier (722) is similar to the carrier (222) described above. In the example illustrated, the carrier (722) includes a molded polymer. In other examples, the carrier (722) may include a glass or other materials.

The liquid interface (224) is described above. The liquid interface (224) is bonded, glued, or otherwise adhered to a face of the carrier (722) along the length of the carrier (722). The carrier (722) may be formed from, or include, glass, polymers, FR4, or other materials.

The electrical interface (726) includes a printed circuit board including electrical contact pads (236) for making an electrical connection with the controller (230) described above with respect to FIGS. 3-5. In the example illustrated, electrical interface (726) is bonded or otherwise adhered to the carrier (722). The electrical interface (726) is electrically connected to the driver (728) as well as the heating elements (530) and sensors (534) of the liquid interface (224) of, for example, FIG. 6. In one example, the driver (728) includes an application-specific integrated circuit (ASIC) which drives the heating elements (530) and the sensors (534) in response to signals received through the electrical interface (726). In other examples, the driving of the heating elements (530) and the sensing by the sensors (534) may alternatively be controlled by a fully integrated driver circuit in lieu of an ASIC.

The collar (730) extends about the carrier (722), and serves as a supply integration interface between carrier (722) and the liquid container (40) in which the sensor (700) is used to detect the level of the liquid (42) within the volume (40). In some examples, the collar (730) provides a liquid seal, separating liquid contained within the volume (40) that is being sensed and electrical interface (726). As shown by FIG. 11, in some examples, the driver (728) as well as the electrical connections between driver (728), the liquid interface (224), and the electrical interface (726) are further covered by a protective electrically insulating wire bond adhesive or encapsulant (735) such as a layer of epoxy molding compound.

FIGS. 13-15 illustrate a sensor (800); another example of the sensor (500) of FIGS. 6-8. The sensor (800) is similar to sensor (700) except that the sensor (800) of FIGS. 13-15 includes a carrier (822) in place of the carrier (722), and omits the electrical interface (726). The carrier (822) includes a printed circuit board or other structure including embedded electrical traces and contact pads to facilitate electrical connection between various electronic components mounted upon the carrier (822). In one example, the carrier (822) includes a composite material composed of woven fiberglass cloth with an epoxy resin binder. In one example, the carrier (822) includes a glass-reinforced epoxy laminate sheet, tube, rod or printed circuit board, such as an FR4 printed circuit board.

As shown by FIGS. 14 and 15, the liquid interface (224) is bonded to the carrier (822) by a die attach adhesive (831). The liquid interface (224) is further wire bonded to the driver (728) and the electrical contact pads (836) provided as part of the carrier (822). The encapsulant (735) overlays or covers the wire bonds between the liquid interface (224), the driver (728), and the electrical contact pads (836). As shown by FIG. 13, the collar (730) is positioned about the encapsulant (735) between a lower end of liquid interface (224) and the electrical contact pads (836).

Figure 18A:
FIGS. 18A-18E are sectional views illustrating the example fluid level sensor of FIG. 13 as it is being formed, according to one example of the principles described herein.
Figure 18B:
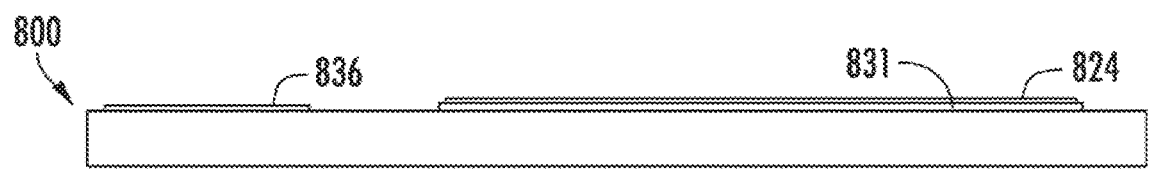

FIGS. 16, 17 and 18A-18E illustrate one example method for forming a fluid level sensor (800). FIG. 16 illustrates a method (900) for forming the fluid level sensor (800). As indicated by block 902, the liquid interface (224) is attached to the carrier (822). As indicated by block 904, the driver (728) is also attached to the carrier (822). FIG. 18A illustrates the carrier (822) prior to the attachment of liquid interface (224) and driver (728). FIG. 18B illustrates the sensor (800) after the attachment of the interface (224) and the driver (728) depicted in FIG. 14 with the adhesive layer (831). In one example, the adhesive layer (831) is stamped upon the carrier (822) to precisely locate the adhesive layer (831). In one example, the attachment of the liquid interface to (24) the driver (728) further includes curing of the adhesive layer (831).

Figure 18C:
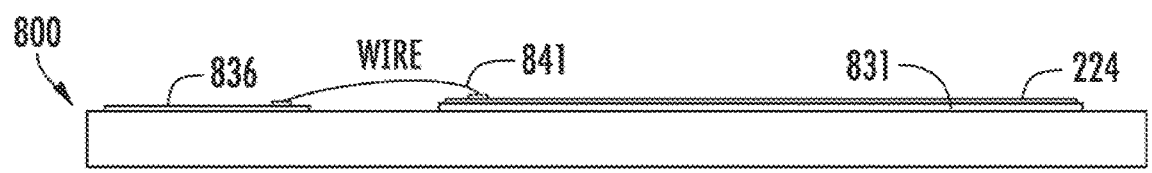
Figure 18D:
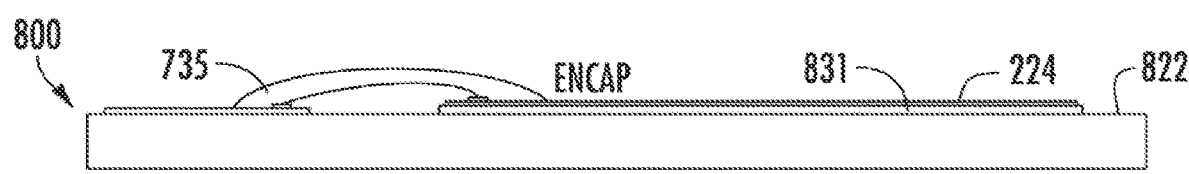
Figure 18E:
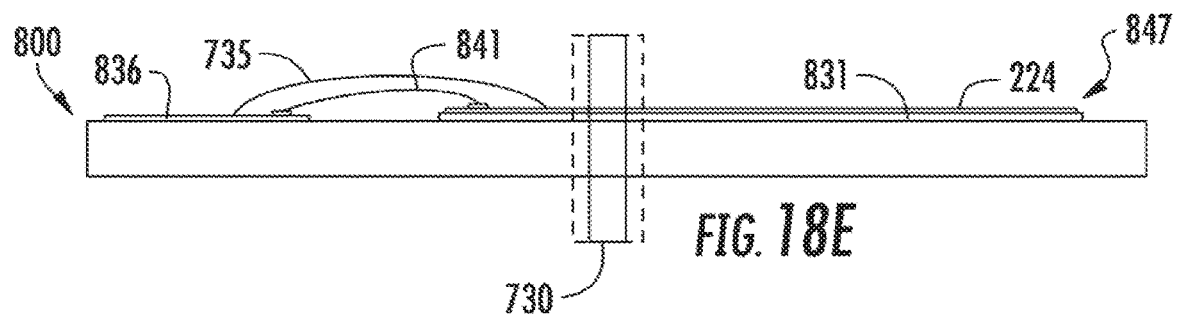

As indicated by block 906 of FIG. 16, the liquid interface (224) is wire bonded to the contact pads (836) of the carrier (822) serving as an electrical interconnect. As indicated by block 908 in FIG. 16, the wire bonds (841) shown in FIG. 18C are then encapsulated within the encapsulant (735). In one example, the encapsulant is cured. As depicted in FIG. 17, in one example, multiple sensors (800) may be formed as part of a single panel (841). For example, a single FR4 panel including electrically conductive traces and contact pads for multiple sensors (800) may be used as a substrate upon which the liquid level sensing interface (224), the drivers (728), and the encapsulant (735) may be formed. As indicated by block 910 of FIG. 16, in such an example, the individual sensors (800) are singulated from the panel. As illustrated by FIG. 18E, in applications where the sensor (800) is to be incorporated as part of a liquid or fluid supply, the collar (730) is further secured to the carrier (822) between the wire bonds (841) and the lower end (847) of the liquid level sensing interface (224). In one example, the collar (730) is adhesively bonded to the carrier (822) by an adhesive that is subsequently cured.

Figure 19:
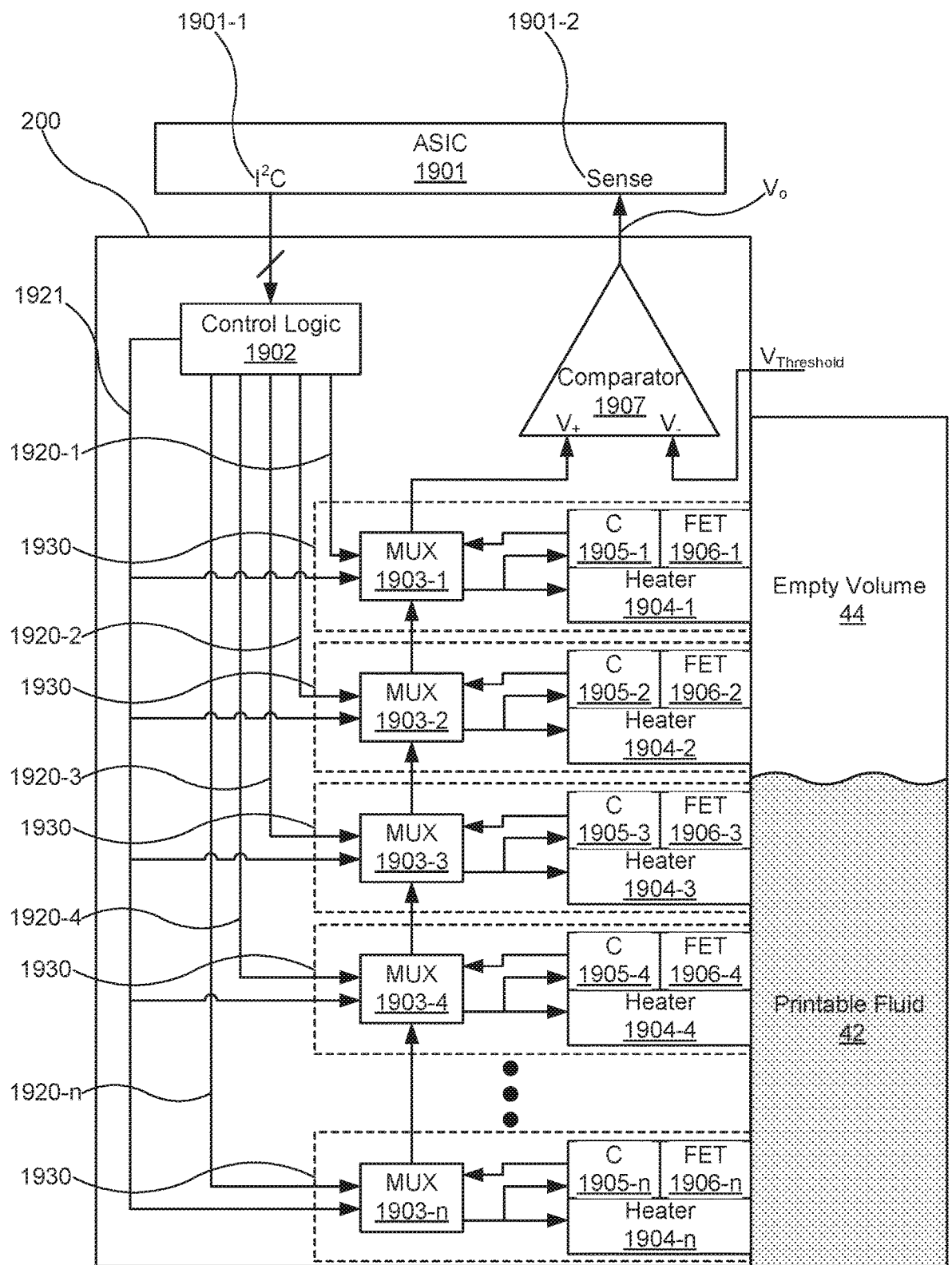
FIG. 19 is a circuit diagram of a fluid level sensor, according to one example of the principles described herein.

With the above description regarding the fluid level sensor (200), FIG. 19 is a circuit diagram of a fluid level sensor (200), according to one example of the principles described herein. The fluid level sensor (200) may be coupled to an application specific integrated circuit (ASIC) (1901) or other processing device or combination of hardware and software that may send and receive signals to and from the fluid level sensor (200), and process the sent and received signals to obtain data regarding a sensed level of printable fluid (42) within the liquid container (312). In one example, the ASIC (1901) may communicate with control logic (1902) located on the fluid level sensor (200) using, for example, an inter-integrated circuit ($I^2C$) command interface (1901-1). In one example, the ASIC (1901) may be located off of the fluid level sensor (200) and the silicon strip (26). In this example, the ASIC (1901) does not take up space on the strip (26) and allows the strip (26) to be smaller in size. However, in another example, the ASIC (1901) and other processing devices may be located on the strip (26).

The fluid level sensor (200) includes control logic (1902) to control the sending of a number of signals to various elements within the fluid level sensor (200). In one example, the control logic (1902) sends select signals via a number of select lines (1920-1, 1920-2, 1920-3, 1920-4, 1920-n) to a number of electrical elements located at a number sensing locations (1930) along the fluid level sensor (200) to select which of the sensing locations (1930) is or are analyzed at a given time. In one example, the control logic (1902) sends heat pulse signals via a heat pulse line (1921) to the sensing locations (1930) to actuate a number of heating elements (1904-1, 1904-2, 1904-3, 1904-4, 1904-n) located at a number sensing locations (1930) along the fluid level sensor (200). The control logic (1902) may send other types of signals as described herein. In one example, the control logic (1902) is located on the die (26). However, in another example, the control logic (1902) may be located off the die (26) in order to allow the size of the die (26) to remain small. In this example, the control logic (1902) may be located on an associated printing device along with the ASIC (1901).

Each of a number of sensing locations (1930) includes a multiplexer (MUX) (1903-1, 1903-2, 1903-3, 1903-4, 1903-n), a heating element (1904-1, 1904-2, 1904-3, 1904-4, 1904-n), a capacitor (C) (1905-1, 1905-2, 1905-3, 1905-4, 1905-n), and a field-effect transistor (FET) (1906-1, 1906-2, 1906-3, 1906-4, 1906-n). The MUX are collectively referred to herein as 1903. The heating elements are collectively referred to herein as 1904. The capacitors are collectively referred to herein as 1905. Further, the FETs are collectively referred to herein as 1906. Each of these elements will be described in more detail below. Although five sensing locations (1930) are depicted in FIG. 19, any number of sensing locations (1930) may be included within the fluid level sensor (200). The number of sensing locations (1930) included within the fluid level sensor (200) defines the granularity and precision of the fluid level sensor (200) where adding more sensing locations (1930) provides a higher precision fluid level sensor (200).

Further, in one example, the heating element (1904-1, 1904-2, 1904-3, 1904-4, 1904-n), the capacitor (1905-1, 1905-2, 1905-3, 1905-4, 1905-n), and the FET (1906-1, 1906-2, 1906-3, 1906-4, 1906-n) may be embodied as a single element that carries out the functionality of the individual elements. For example, the heating element (1904-1, 1904-2, 1904-3, 1904-4, 1904-n) may be incorporated into a circuit formed by a capacitor (1905-1, 1905-2, 1905-3, 1905-4, 1905-n), and FET (1906-1, 1906-2, 1906-3, 1906-4, 1906-n) pair. However, in another example, the heating element (1904-1, 1904-2, 1904-3, 1904-4, 1904-n), may be a separate device relative to the capacitor (1905-1, 1905-2, 1905-3, 1905-4, 1905-n) and the FET (1906-1, 1906-2, 1906-3, 1906-4, 1906-n).

The multiplexers (MUX) (1903-1, 1903-2, 1903-3, 1903-4, 1903-n) for each sensing location (1930) are any device that selects one of several analog or digital input signals, and forwards the selected input signal into a single line. For example, a MUX (1903-1, 1903-2, 1903-3, 1903-4, 1903-n) may receive a signal from one of the select lines (1920-1, 1920-2, 1920-3, 1920-4, 1920-n) indicating that the sensing location (1930) associated with that particular MUX (1903-1, 1903-2, 1903-3, 1903-4, 1903-n) has been selected by the control logic (1902) for analysis. Further, the MUX (1903-1, 1903-2, 1903-3, 1903-4, 1903-n) may receive a heat pulse signal from the heat pulse line (1921) as controlled by the control logic (1902). The heat pulse signal from the heat pulse line (1921) actuates the heating element (1904-1, 1904-2, 1904-3, 1904-4, 1904-n), and the heating element heats up. In one example, the heating element (1904-1, 1904-2, 1904-3, 1904-4, 1904-n) includes any resistive component that generates heat co-located with the capacitor (1905-1, 1905-2, 1905-3, 1905-4, 1905-n) and field-effect transistor (FET) (1906-1, 1906-2, 1906-3, 1906-4, 1906-n) pair, and may include, for example, a resister, a metal-oxide-semiconductor field-effect transistor (MOSFET), or other electrical component that produces heat. In one example, the heating element (1904-1, 1904-2, 1904-3, 1904-4, 1904-n) may be embodied as two separate electrical devices including a heating element and a sensor. In another example, the heating element (1904-1, 1904-2, 1904-3, 1904-4, 1904-n) may include a sensor device to detect a temperature of the heating element (1904-1, 1904-2, 1904-3, 1904-4, 1904-n) in order to provide feedback regarding a temperature of the heating element and obtain a predefined temperature.

The capacitor (1905-1, 1905-2, 1905-3, 1905-4, 1905-n) is any type of passive two-terminal electrical component used to store electrical energy temporarily in an electric field. The capacitor (1905-1, 1905-2, 1905-3, 1905-4, 1905-n) is paired with a FET (1906-1, 1906-2, 1906-3, 1906-4, 1906-n), and acts as a voltage source of the FET (1906-1, 1906-2, 1906-3, 1906-4, 1906-n) for ink level detection purposes as will be described in more detail below.

The FET (1906-1, 1906-2, 1906-3, 1906-4, 1906-n) may be any electrical component that uses an electric field to control the shape and, in turn, the electrical conductivity of a channel of one type of charge carrier in a semiconductor material. The FET (1906-1, 1906-2, 1906-3, 1906-4, 1906-n) may be, for example, a field-effect transistor, a metal-oxide-semiconductor field-effect transistor (MOSFET), an n-channel MOSFET, a p-channel MOSFET, or any other form of transistor.

The MUX (1903-1, 1903-2, 1903-3, 1903-4, 1903-n) sends a signal to the heating element (1904-1, 1904-2, 1904-3, 1904-4, 1904-n) and the capacitor (1905-1, 1905-2, 1905-3, 1905-4, 1905-n) to begin heating of the heating element (1904-1, 1904-2, 1904-3, 1904-4, 1904-n) and to begin a pre-charging process of the capacitor (1905-1, 1905-2, 1905-3, 1905-4, 1905-n). In one example, a sensor may be associated with the heating element (1904-1, 1904-2, 1904-3, 1904-4, 1904-n) to ensure that a predefined temperature of the heating element is reached. In one example, when heating of the heating element (1904-1, 1904-2, 1904-3, 1904-4, 1904-n) ends, the pre-charging of the capacitor (1905-1, 1905-2, 1905-3, 1905-4, 1905-n) also ends.

In another example, pre-charging of the capacitor (1905-1, 1905-2, 1905-3, 1905-4, 1905-n) may end after the heat signal has ended. In this example, the beginning time associated with a rate of decay of the voltage within the capacitor (1905-1, 1905-2, 1905-3, 1905-4, 1905-n) may be measured from the time the capacitor (1905-1, 1905-2, 1905-3, 1905-4, 1905-n) stops pre-charging and begins to discharge.

In the examples described herein, pre-charging of the capacitor (1905-1, 1905-2, 1905-3, 1905-4, 1905-n), and determining the discharge voltage after a fixed amount of time may be performed. However, the opposite may also be performed wherein a capacitor (1905-1, 1905-2, 1905-3, 1905-4, 1905-n) is charged up through a leaky FET (1906-1, 1906-2, 1906-3, 1906-4, 1906-n), and when or if the voltage within the capacitor (1905-1, 1905-2, 1905-3, 1905-4, 1905-n) gets above a predefined value in a fixed amount of time may be sensed. In this example, the rate of charging of the capacitor (1905-1, 1905-2, 1905-3, 1905-4, 1905-n) through the FET (1906-1, 1906-2, 1906-3, 1906-4, 1906-n) is used to determine the level of printable fluid (42) within the container (312). In this example, the capacitor (1905-1, 1905-2, 1905-3, 1905-4, 1905-n) may be pre-charged to 0 volts, the heating element (1904-1, 1904-2, 1904-3, 1904-4, 1904-n) is activated, and the voltage of the capacitor (1905-1, 1905-2, 1905-3, 1905-4, 1905-n) is measured at the end of a sample time period and reported. The leak path of the FET (1906-1, 1906-2, 1906-3, 1906-4, 1906-n) may be set to a source voltage ($V_{dd}$) or some high voltage.

The signal from the MUX (1903-1, 1903-2, 1903-3, 1903-4, 1903-n) may end, and the time the MUX (1903-1, 1903-2, 1903-3, 1903-4, 1903-n) stops the signal is conveyed to a comparator (1907). The comparator (1907) is any electronic component that compares two voltages or currents and outputs a digital signal indicating which is larger. It has two analog input terminals $V_+$ and $V_-$ and one binary digital output $V_o$. In one example, the signal from the comparator (1907) is discrete rather than digital. The comparator (1907) switches or flips upon detection of a voltage of the capacitor (1905-1, 1905-2, 1905-3, 1905-4, 1905-n) moving above or below a threshold voltage ($V_{threshold}$) or bias voltage such as a reference voltage or other predefined, stable threshold voltage. $V_o$ of the comparator (1907) is transmitted to the ASIC (1901) via a dedicated signal line to a sense processor (1901-2) that processes the signals from the comparator, and outputs a determination as to a level of printable fluid (42) within the liquid container (312). However, in another example, instead of a dedicated signal line for communicating the comparator state to the ASIC (1901), the state of the comparator (1901) may be communicated over the I²C command interface (1901-1) used to initiate the sensing of the sensing locations (1930).

Once the pre-charging of the capacitor (1905-1, 1905-2, 1905-3, 1905-4, 1905-n) ends along with the heating of the heating element (1904-1, 1904-2, 1904-3, 1904-4, 1904-n), the capacitor (1905-1, 1905-2, 1905-3, 1905-4, 1905-n) begins to discharge. However, the discharge of the capacitor (1905-1, 1905-2, 1905-3, 1905-4, 1905-n) is through the FET (1906-1, 1906-2, 1906-3, 1906-4, 1906-n) associated with that capacitor (1905-1, 1905-2, 1905-3, 1905-4, 1905-n). The discharge of voltage from the capacitor (1905-1, 1905-2, 1905-3, 1905-4, 1905-n) through the FET (1906-1, 1906-2, 1906-3, 1906-4, 1906-n) may be referred to as "decay" off of the capacitor (1905-1, 1905-2, 1905-3, 1905-4, 1905-n), or, in other terms, "leakage" of current through the FET (1906-1, 1906-2, 1906-3, 1906-4, 1906-n). Thus, leakage may refer to a gradual loss of energy from a charged capacitor. Leakage may be caused by electronic devices attached to the capacitors, such as the FET (1906-1, 1906-2, 1906-3, 1906-4, 1906-n), which conduct a small amount of current even when they are turned off. Even though this off current is an order of magnitude less than the current through the device when it is on, the current still slowly discharges the capacitor (1905-1, 1905-2, 1905-3, 1905-4, 1905-n).

As depicted in FIG. 19, the FET (1906-1, 1906-2, 1906-3, 1906-4, 1906-n) is located next to the heating element (1904-1, 1904-2, 1904-3, 1904-4, 1904-n) and the capacitor (1905-1, 1905-2, 1905-3, 1905-4, 1905-n), and is therefore heated up by the heating element (1904-1, 1904-2, 1904-3, 1904-4, 1904-n). With the heating of the FET (1906-1, 1906-2, 1906-3, 1906-4, 1906-n), the FET (1906-1, 1906-2, 1906-3, 1906-4, 1906-n) is able to leak relatively more current (i.e., voltage decay) from the capacitor (1905-1, 1905-2, 1905-3, 1905-4, 1905-n) than when the FET (1906-1, 1906-2, 1906-3, 1906-4, 1906-n) is relatively cooler.

Further, as the FET (1906-1, 1906-2, 1906-3, 1906-4, 1906-n) cools, the rate of leakage of the capacitor (1905-1, 1905-2, 1905-3, 1905-4, 1905-n) through the FET (1906-1, 1906-2, 1906-3, 1906-4, 1906-n) is reduced. In other words, less current leaks through the FET (1906-1, 1906-2, 1906-3, 1906-4, 1906-n) at cooler temperatures of the FET (1906-1, 1906-2, 1906-3, 1906-4, 1906-n). In this manner, the leakage rate may indicate a cooling rate of the FET (1906-1, 1906-2, 1906-3, 1906-4, 1906-n).

This knowledge may be coupled with the fact that a FET (1906-1, 1906-2, 1906-3, 1906-4, 1906-n) placed along the liquid container (312) may dissipate heat more quickly when that FET (1906-1, 1906-2, 1906-3, 1906-4, 1906-n) is next to printable fluid (42) within the liquid container (312). relative to when that FET (1906-1, 1906-2, 1906-3, 1906-4, 1906-n) is next to an empty volume (44) of the liquid container (312). This is because heat transfers through the printable fluid (42) easier and more quickly relative to an empty volume of, for example, air. Thus, a level of printable fluid (42) along the fluid level sensor (200) within the liquid container (312) may be detected based on the idea that a first sensing location (1930) may indicate that the first sensing location (1930) is juxtaposition to the printable fluid (42) while a neighboring sensing location (1930) may indicate that the second sensing location (1930) is next to the empty volume (44). Knowing that two neighboring sensing locations (1930) are sensing differences indicates that the level of printable fluid (42) within the liquid container (312) is between those two sensing locations (1930). Further, during the heating and pre-charging phase of the sensing location (1930), a FET (1906-1, 1906-2, 1906-3, 1906-4, 1906-n) that is next to printable fluid (42) may be heated to a relatively lower maximum temperature than a FET (1906-1, 1906-2, 1906-3, 1906-4, 1906-n) that is next to the empty volume (44) since, again, the thermal conductance of the empty volume (44) is greater than that of the printable fluid (42).

The comparator (1907) receives an indication from the MUX (1903-1, 1903-2, 1903-3, 1903-4, 1903-n) as to when the capacitor (1905-1, 1905-2, 1905-3, 1905-4, 1905-n) begins to discharge and when the voltage in the capacitor (1905-1, 1905-2, 1905-3, 1905-4, 1905-n) drops below the $V_{threshold}$. The time between these two events may be defined as a leakage rate when viewed from the perspective of the capacitor (1905-1, 1905-2, 1905-3, 1905-4, 1905-n) or may be referred to as a temperature decay rate when viewed from the perspective of the FET (1906-1, 1906-2, 1906-3, 1906-4, 1906-n). The comparator (1907) converts the temperature decay rate of the FET (1906-1, 1906-2, 1906-3, 1906-4, 1906-n) based on the leakage of the capacitor (1905-1, 1905-2, 1905-3, 1905-4, 1905-n) through the FET (1906-1, 1906-2, 1906-3, 1906-4, 1906-*n*) into a time based digital signal that may be communicated back to, for example the ASIC (1901) or other processing device of a printing device in which the fluid level sensor (200) is incorporated. The printing device may use the information to inform a user of the level of printable fluid (42) within the liquid container (312), refuse to print based on the detected level (e.g., if the level is too low), perform a print job in an "ink preservation" mode where less ink is deposited if the level drops below a threshold amount, send a number of notifications to a user regarding the amount of printable fluid (42) within the liquid container (312), perform other actions associated with printable fluid levels, or combinations thereof.

Figure 20:
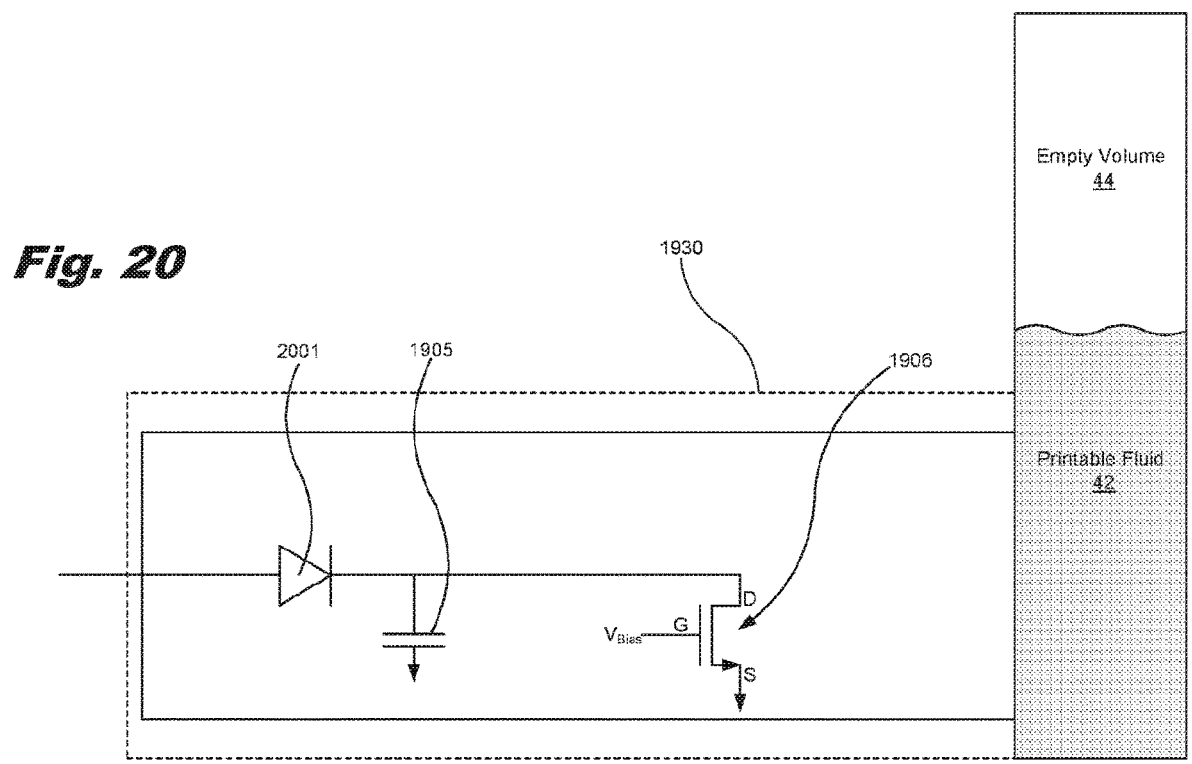
FIG. 20 is a circuit diagram of a capacitor and field-effect transistor (FET) of a sensing location of the fluid level sensor of FIG. 19, according to one example of the principles described herein.

FIG. 20 is a circuit diagram of a capacitor (1905-1, 1905-2, 1905-3, 1905-4, 1905-*n*) and FET (1906-1, 1906-2, 1906-3, 1906-4, 1906-*n*) of a sensing location (1930) of the fluid level sensor of FIG. 19, according to one example of the principles described herein. In one example, a blocking diode (2001) may be included to allow for the pre-charging of the capacitor (1905-1, 1905-2, 1905-3, 1905-4, 1905-*n*) while isolating the capacitor (1905-1, 1905-2, 1905-3, 1905-4, 1905-*n*) and FET (1906-1, 1906-2, 1906-3, 1906-4, 1906-*n*) during the discharge of the capacitor (1905-1, 1905-2, 1905-3, 1905-4, 1905-*n*) and the beginning of the sensing phase where the temperature decay rate of the FET (1906-1, 1906-2, 1906-3, 1906-4, 1906-*n*) based on the leakage of the capacitor (1905-1, 1905-2, 1905-3, 1905-4, 1905-*n*) through the FET (1906-1, 1906-2, 1906-3, 1906-4, 1906-*n*) is determined.

The capacitor (1905) leaks current through the FET (1906) resulting in a decay in voltage in the capacitor (1905). The FET (1906) may be any type of transistor-based device. In the example of FIG. 20, the $V_{Bias}$ is provided via the gate, and the current from the capacitor (1905) is leaked through the FET (1906) through the drain. The level of the bias voltage ($V_{Bias}$) applied to the FET (1906) controls the amount of leakage through the FET (1906) at a given temperature of the FET (1906).

Figure 21:
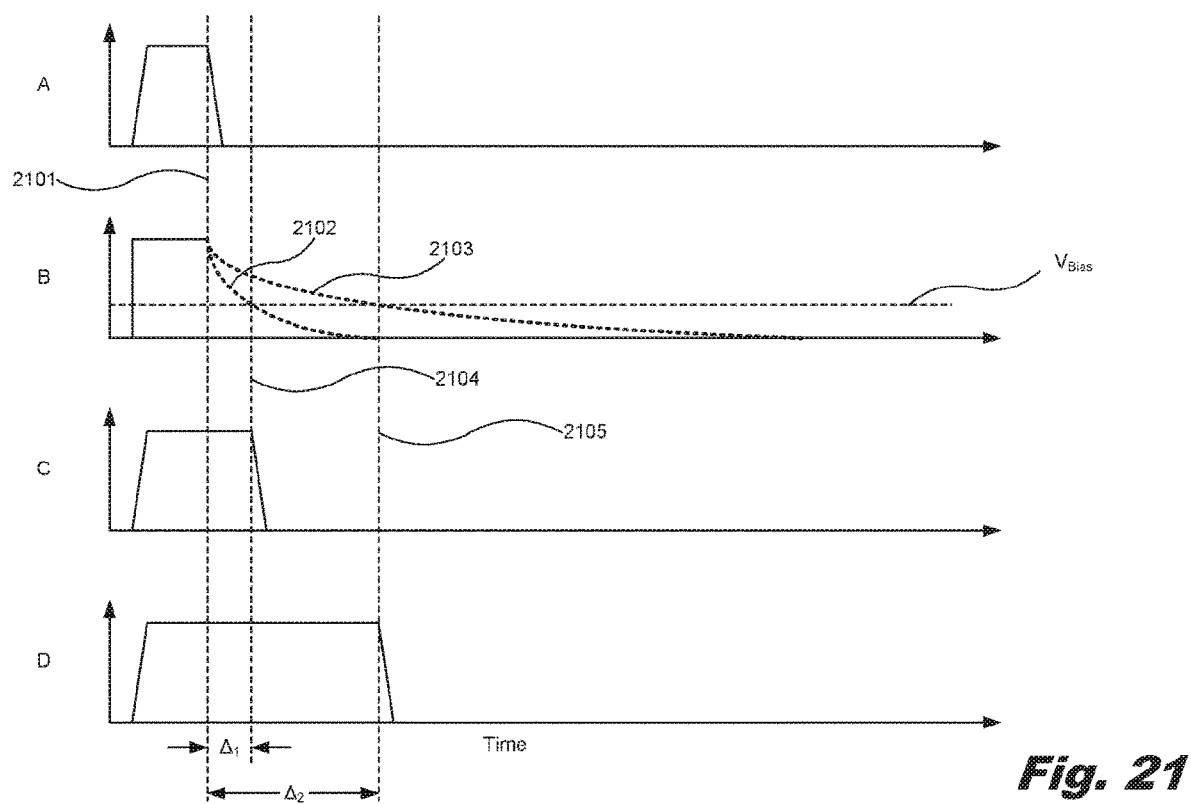
FIG. 21 is a series of graphs of a sequence of sensing of a level of printing fluid through a channel of the FET, according to one example of the principles described herein.

FIG. 21 is a series of graphs of a sequence of sensing of a level of printing fluid (42) through a channel of the FET (1906), according to one example of the principles described herein. Graph A represents a heat pulse signal received from the control logic (1902) by a heating element (1904) via a MUX (1903) of a sensing location (1930) being sensed. Graph B represents the voltage of the capacitor (1905) during a pre-charge event and as the voltage on the capacitor (1905) decays, and current leaks through the FET (1906). Graph C represents the output of the comparator (1907) based on signals received from a sensing location (1930) where ink is present next to the sensing locations (1930). Graph D represents the output of the comparator (1907) based on signals received from a sensing location (1930) where ink is not present next to the sensing location (1930). The x-axis of all of Graphs A through D represents time.

In Graph A, a heat pulse signal is received from the control logic (1902) by a heating element (1904) along heat pulse line (1921) and via the corresponding MUX (1903). The control logic (1902), in sending the heat pulse signal, also sends a select signal via the select line (1920) associated with the sensing location (1930) of the heating element (1904). In this manner, the sensing location (1930) is selected for printable fluid level detection. The heat pulse signal causes the heating element (1904) to heat.

Before or during the sending of the heat pulse signal, the MUX (1903) provides a pre-charge to the capacitor (1905) by causing a potential difference to occur across the conductors of the capacitor (1905) and develop an electric field across a dielectric of the capacitor (1905). This causes a positive charge to collect on one plate and negative charge to collect on the other plate and causing a voltage to be stored in the capacitor (1905). Line 2101 indicates the time at which the heat pulse signal from the MUX (1903) ends. When the heat pulse signal ends, the pre-charging of the capacitor (1905) also ends. When the pre-charging ends, the capacitor (1905) begins to discharge through the FET (1906) at an electrical current leakage rate that is dependent on the temperature of the FET (1906). Two discharge rates are depicted in Chart B of FIG. 21. The capacitor (1905) leaks off slower in situations where the FET (1906) is relatively cooler. Thus, after being heated by the heating element (1904), the FET (1906) may experience a rate of cooling that is relatively faster when the level of printable fluid (42) comes into contact with the sensing location (1930) next to the FET (1906) as compared to when the printable fluid (42) is lower than the level of the sensing location (1930). Conversely, the capacitor (1905) leaks off faster in situations where the FET (1906) is relatively warmer. Thus, after being heated by the heating element (1904), the FET (1906) may experience a rate of cooling that is relatively slower when the level of printable fluid (42) is lower than the level of the sensing location (1930) next to the FET (1906) as compared to when the printable fluid (42) comes into contact with the sensing location (1930). In other words, the faster the temperature of the FET (1906) decays, the slower the voltage on the capacitor (1905) will decay.

Thus, turning again to FIG. 21, a first discharge rate is indicated by curve 2102 and represents the discharge of the voltage on the capacitor (1905) as current leaks through the FET (1906) when the FET (1906) cools relatively slower than the cooling rate of the FET (1906) in curve 2103. In curve 2102, the FET (1906) is and remains hotter such that voltage from the capacitor (1905) is able to decay faster, and current leaks through the FET (1906) faster than the rate depicted by curve 2103. The opposite is true with regard to curve 2103.

The comparator (1907), using $V_{threshold}$ as an input, continually compares the voltage of the capacitor (1905) with the $V_{threshold}$, and flips its output when the voltage within the capacitor (1905) drops below $V_{threshold}$. The time at which the heat pulse signal from the MUX (1903) ends as indicated by line 2101 until the time the comparator flips may be designated by a time differential ($\Delta_1$, $\Delta_2$), and may indicate whether the sensing location (1930) is next to printable fluid (42) or empty volume (44). Graphs C and D indicate output of the comparator (1907) where the sensing location (1930) is next to printable fluid (42), and where the sensing location (1930) is next to printable fluid (42) but empty space (44), respectively. The curves 2102 and 2103 cross $V_{threshold}$ at lines 2104 and 2105, respectively. As to curve 2102, $\Delta_1$ is calculated from line 2101 to line 2104, and defines a time differential indicative of (1) capacitor (1905) current leak that is faster than curve 2103; (2) a FET (1906) that cools slower and remains hotter for longer; and (3) the lack of printable fluid (42) at the sensing location (1930). As to curve 2103, $\Delta_2$ is calculated from line 2101 to line 2105, and defines a time differential indicative of (1) capacitor (1905) current leak that is slower than curve 2102; (2) a FET (1906) that cools faster; and (3) the existence of printable fluid (42) at the sensing location (1930). The comparator (1907) sends this information onto the ASIC (1901) or sends signals indicative of this information onto the ASIC (1901). The ASIC (1901) may process the information and determine where the level of the printable fluid (42) is, and, in turn, how much printable fluid (42) remains in the liquid container (312).

Figure 22:
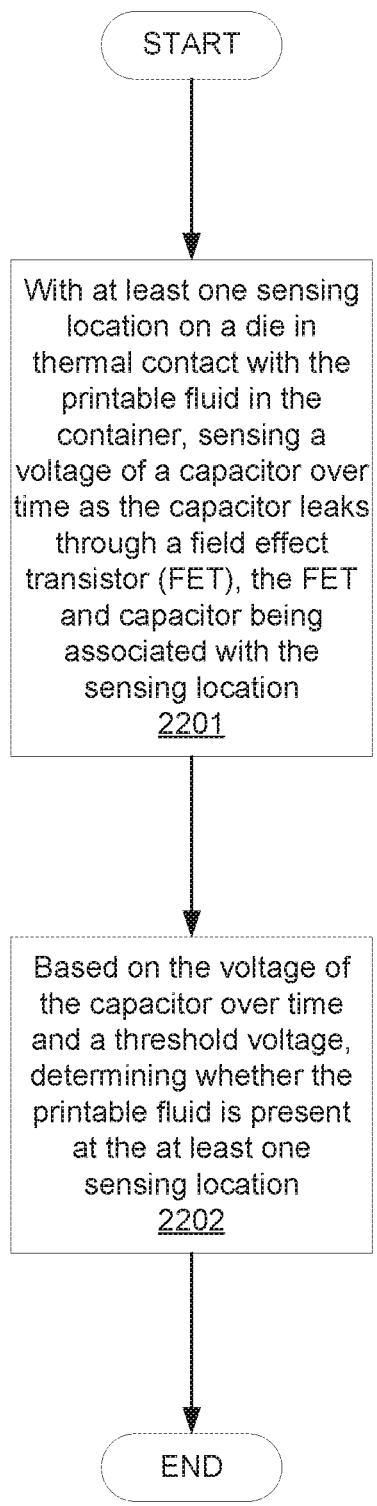
FIG. 22 is a flowchart showing a method of detecting a level of printable fluid in a container, according to one example of the principles described herein.

FIG. 22 is a flowchart showing a method of detecting a level of printable fluid (42) in a container (312), according to one example of the principles described herein. The method of FIG. 22 may begin by sensing (block 2201) a voltage of a capacitor (1905) over time as current from the capacitor (1905) leaks through a field effect transistor (FET) (1906). Block 2201 is performed with at least one sensing location (1930) on a die (26) in thermal contact with the printable fluid (42) in the container (312). In one example, the FET (1906) and capacitor (1905) is associated with the sensing location (1930). At block 2202, it is determined whether the printable fluid (42) is present at the at least one sensing location (1930). This determination is based on the voltage of the capacitor (1905) over time and a threshold voltage.

Figure 23:
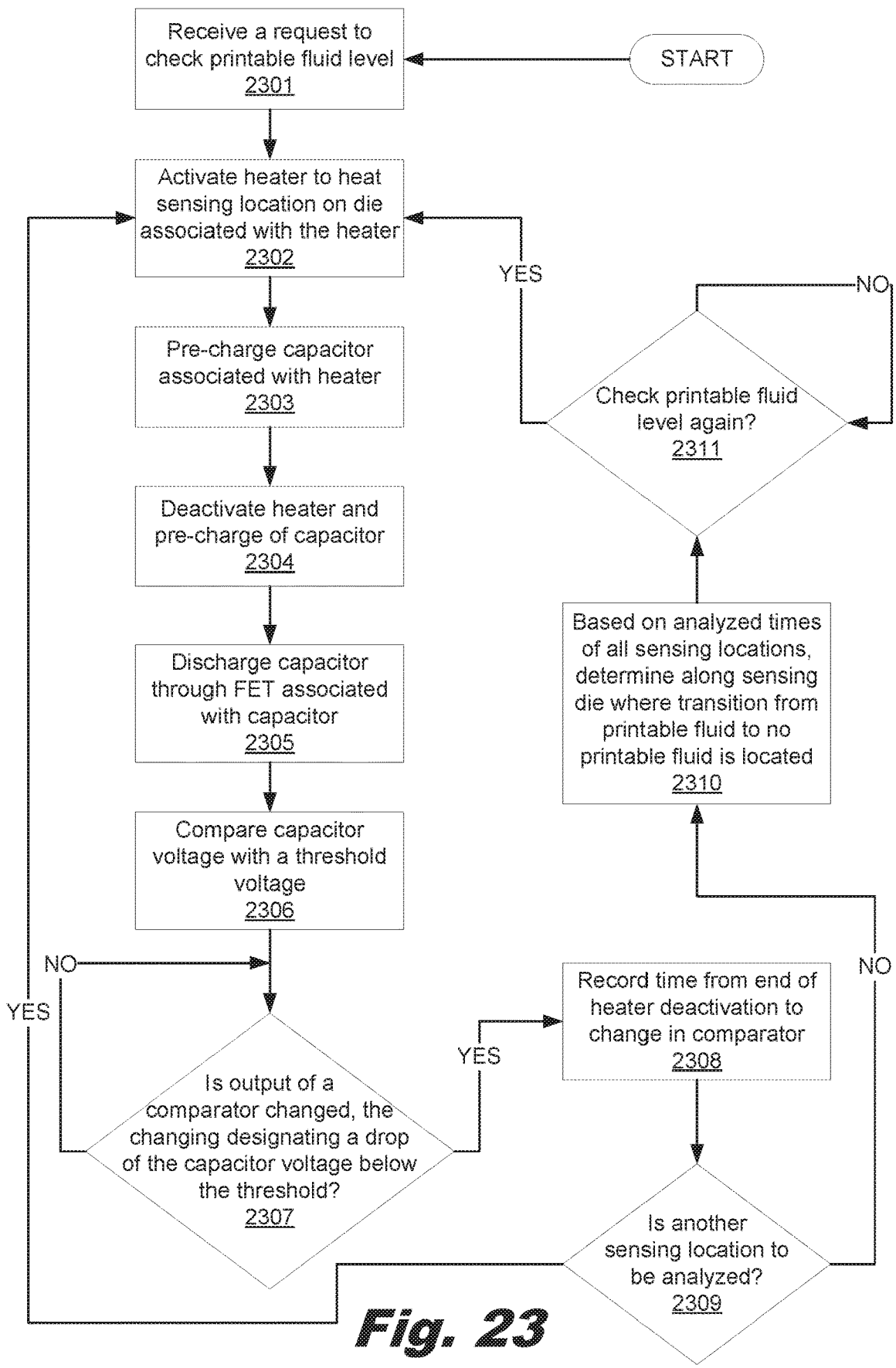
FIG. 23 is a flowchart showing a method of detecting a level of printable fluid in a container, according to another example of the principles described herein.

FIG. 23 is a flowchart showing a method of detecting a level of printable fluid (42) in a container (312), according to another example of the principles described herein. At block 2301, a request to check a level of printable fluid (42) is received. In one example, a printing device in which the fluid level sensor (500) is incorporated or a processing device of the printing device may be used to determine when the request to check a level of printable fluid (42) is to be sent and acted upon. In another example, the ASIC (1901) may be responsible for determining when the request to check a level of printable fluid (42) is to be sent and acted upon. In still another example, a schedule may be set where the level of the printable fluid (42) may be checked. In yet another example, the level of the printable fluid (42) is checked when an event within the printing device occurs such as a powering on event, a powering off event, a print job occurs, and interaction with the printing device occurs, among other types of events.

The method may include activating (block 2302) at least one of the heating elements (1904) to heat a sensing location (1930) with the heating elements (1904). In one example, at least one heating element (1904) is activated for a long enough time to allow the area of the die (26) surrounding the sensing location (1930) to heat up and for the FET (1906) associated with the at least one heating element (1904) to heat to a temperature that allows for the detection of a decay of the temperature of the FET (1906). Before or during block 2302, a pre-charging (block 2303) of the capacitor (1905) associated with the heating element (1904) occurs.

The ASIC (1901) and control logic (1902) deactivate (block 2304) at least one heating element (1904) and the pre-charging of the capacitor (1905). By performing block 2304, the capacitor (1905) discharges (block 2305) through an associated FET (1906). A comparator (1907) compares (block 2306) the voltage of the capacitor (1905) with a threshold voltage ($V_{threshold}$). In one example, the printing device communicates a threshold programmable reference voltage ($V_{threshold}$) to be used to the ASIC (1901) or other processing device. The threshold voltage ($V_{threshold}$) may be user defined. In another example, the threshold voltage ($V_{threshold}$) may be generated in the die (26).

In still another example, the threshold voltage ($V_{threshold}$) may be variable. In this example, the variable threshold voltage ($V_{threshold}$) may be set by a register that is programmed via the I²C command interface (1901-1). The threshold voltage ($V_{threshold}$) may be varied through a number of iterations of the method of FIG. 23.

At block 2307, it is determined if the output ($V_o$) of the comparator (1907) changed. The changing of the output of the comparator (1907) designates a drop of the capacitor (1905) voltage below $V_{threshold}$. If the voltage of the capacitor (1905) has not dropped below $V_{threshold}$ (block 2307, determination NO), then the comparator continually makes such a determination (block 2307) until the voltage of the capacitor (1905) has dropped below $V_{threshold}$ (block 2307, determination YES). The time from the end of the deactivation of the heating element (1904) to the change in the comparator (1907) is recorded (block 2308).

Another determination (block 2309) is made regarding whether another sensing location (1930) is to be analyzed. If at least one more sensing location (1930) is to be analyzed (block 2309, determination YES), then the method of FIG. 23 loops back to block 2302, and a subsequent sensing location (1930) is analyzed using blocks 2302 through 2309. If, however, more sensing location (1930) are not to be analyzed (block 2309, determination NO) because, for example the last sensing location (1930) has been analyzed or the ASIC (1901) or other processing device determines enough sensing locations (1930) have been analyzed, then the method of FIG. 23 proceeds to block 2310. At block 2310, it is determined where along the sensing die (26) the transition from the printable fluid (42) to empty space (44) (i.e., no printable fluid (42)) is located. This determination may be made based on the analyzed times of the all of the sensing locations (1930) stored at block 2306. Further, block 2310 may be performed using the ASIC (1901), the control logic (1902), a number of the MUXs (1903), the comparator (1907), or combinations thereof.

In executing the above methods, the individual sensing locations (1930) may be activated in any order or pattern. In one example, the sensor locations (1930) may be activated and sensed in order from the top of the die (26) to the bottom or vice versa. This allows for a simple and easily processed determination of printable fluid (42) level.

In another example, a binary search may be performed. In this example, the top sensing location (1930) and the bottom sensing location (1930) of the die (26) may be simultaneously or non-simultaneously activated. This allows for a faster printable fluid (42) level detection by allowing for multiple sensing locations (1930) to be activated. This example provides for non-neighboring sensor locations (1930) to be activated to increase speed of detection with limited increase in power consumption. Further, this example, avoids cross talk between sensor locations (1930) that may occur by a heating element (1904) from one sensing location (1930) effecting the temperature of a FET (1906) at a neighboring sensing location (1930).

In still another example, a previous location of the printable fluid (42) level may be stored in memory and used to determine which of a number of sensing locations (1930) may be analyze first. In this example, a memory device associated with the fluid level sensor (500) may be searched and the last two neighboring sensing locations (1930) between which the printable fluid (42) level was located may be recalled from memory. Activation of sensing locations (1930) may begin at surrounding sensor locations where the last printable fluid (42) level was located. This method of searching based on a last stored printable fluid (42) level greatly speeds up detection of the current printable fluid (42) level.

Further, because the sensing locations (1930) may not provide much signal, discontinuities within a mapping of the sensed values may be used to detect the level of the printable fluid (42). In this example, several sensing locations (1930) may be activated about a point of interest, and a map or plot of the values obtained from the sensing locations (1930)

may be produced in order to look for discontinuities and to interpolate the level of the printable fluid (42). This example minimizes the amount of precision required in the die (26) and provides for higher fidelity while minimizing the signal to noise ratio on the sensing locations (1930).

Thus, the above methods provide detection of a level of printable fluid in a container. The method may include, with at least one sensing location on a die in thermal contact with the printable fluid in the container, sensing a voltage of a capacitor over time as the capacitor leaks through a field effect transistor (FET). The FET and capacitor are associated with the sensing location. Based on the voltage of the capacitor over time and a threshold voltage, the method determines whether the printable fluid is present at the at least one sensing location.

A value of the voltage of the capacitor over time may be generated by a discharge of the capacitor. In this example, the method further includes sensing a rate at which a voltage of the capacitor discharges through the FET until the capacitor's voltage drops below a threshold voltage, and with a voltage comparator coupled to the sensing location, based on the rate of discharge, determining whether the printable fluid is present at the at least one sensing location. The voltage comparator flips states when the capacitor's voltage drops below the threshold voltage.

The FET cools at a first cooling rate relatively faster than a second cooling rate. The first cooling rate defines a first capacitor current leak off rate that is slower than a second capacitor current leak off rate, and the first capacitor current leak-off rate indicates the presence of the printable fluid at the at least one sensing location.

The method may further include, with the voltage comparator, outputting time-based information comparing the sensed rate of discharge generated at a plurality of sensing locations to the threshold voltage. The time-based information is representative of which of the plurality of sensing locations the printable fluid is present.

The method may further include sending a heat pulse signal to a heating element located juxtaposition to the sensor to heat the heating element, pre-charging the capacitor associated with a respective heating element and sensor pair to a predetermined voltage, and discharging the capacitor through the FET when the heat pulse signal ends. The at least one sensing location includes a plurality of sensing locations. The plurality of sensing locations are individually selected for analyzation based on instruction from a processing device.

In one example, the value of the voltage of the capacitor over time is generated by a charging of the capacitor. In this example, the method further includes sensing a rate at which a voltage of the capacitor charges through the FET until the capacitor's voltage rises above a threshold voltage, and with a voltage comparator coupled to the sensing location, based on the rate of charge, determining whether the printable fluid is present at the at least one sensing location. The voltage comparator flips states when the capacitor's voltage rises above the threshold voltage.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the ASIC (1901) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a method of detecting a level of printable fluid in a container includes, with at least one sensing location on a die in thermal contact with the printable fluid in the container, sensing a voltage of a capacitor over time as current from the capacitor leaks through a field effect transistor (FET). The FET and capacitor are associated with the sensing location. The method may further include, based on the voltage of the capacitor over time and a threshold voltage, determining whether the printable fluid is present at the at least one sensing location.

Example described herein save on sensing silicon cost by providing a simple method for capturing and communicating ink levels. The system further provides communication via the printer via digital signals which are more immune to electronic noise than analog signals. Still further, this system which uses timing information, lends itself to securing ink level information far better than a simple on/off signal.

The preceding description has been presented to illustrate and describe examples of the principles described. This description is not intended to be exhaustive or to limit these principles to any precise form disclosed. Many modifications and variations are possible in light of the above teaching.

What is claimed is:

1. A fluid level sensor for detecting a level of fluid in a container comprising:
   an array of sensing locations associated with a plurality of fluid levels, each sensing location comprising:
      a heating element to heat a surrounding area of the sensing location;
      a capacitor to discharge a voltage through a field effect transistor (FET); and
   a voltage comparator coupled to the sensing locations to compare a voltage of the capacitor to a voltage threshold over time to determine a rate of the discharge of the capacitor which is indicative of a temperature decay rate at the FET which indicates whether fluid is present at the sensing location to determine a level of the fluid along the array of sensing locations.

2. The fluid level sensor of claim 1, further comprising control logic to control when a first one of the sensing locations is actuated.

3. The fluid level sensor of claim 2, wherein the control logic:
   sends a heat pulse to a first one of the heating elements of the first one of the sensing locations when the first one of the sensing locations is selected; and
   determines the rate of the discharge of the capacitor from the sensing location from output of the voltage comparator.

4. The fluid level sensor of claim 2, wherein the control logic actuates a subsequent sensing locations of the array of sensing locations.

5. The fluid level sensor of claim 1, wherein the number of sensing locations within the array of sensing locations defines a granularity of fluid level detection.

6. The fluid level sensor of claim 1, wherein the FET is thermally coupled to an interface between the array of sensing locations and a fluid or air within the container.

7. A print cartridge that detects a level of printable fluid therein comprising:
  an array of sensing locations associated with a plurality of fluid levels, each sensing location comprising:
    a heating element to heat a surrounding area of the sensing location;
    a capacitor to leak current through a field effect transistor (FET); and
  a voltage comparator coupled to the sensing locations to compare, for any sensing location, a voltage of the capacitor to a voltage threshold over time to, based on a rate of current leakage from the capacitor through the field-effect transistor (FET), determine a level of the fluid along the array of sensing locations.

8. The print cartridge of claim 7, further comprising control logic to select which of the sensing locations within the array to analyze.

9. The print cartridge of claim 8, wherein the control logic selects which of the sensing locations within the array to analyze based on a binary search scheme, based on a previously-identified level of printable fluid, based on a series analysis of the sensing locations.

10. The print cartridge of claim 7, wherein:
  the FET cools at a first cooling rate relatively faster than a second cooling rate,
  the first cooling rate defines a first capacitor current leak off rate that is slower than a second capacitor current leak off rate, and
  the first capacitor current leak-off rate indicates the presence of the printable fluid at the at least one sensing location.

11. The print cartridge of claim 7, wherein the voltage comparator:
  senses a rate at which the voltage within the capacitor drops below a threshold; and
  based on the rate at which the voltage within the capacitor drops below the threshold, determine the level of the fluid along the array of sensory locations.

12. The print cartridge of claim 7, wherein the voltage comparator:
  senses a rate at which the voltage within the capacitor rises above a threshold; and
  based on the rate at which the voltage within the capacitor rises above the threshold, determine the level of the fluid along the array of sensory locations.

13. The print cartridge of claim 11, further comprising control logic to:
  discharge the capacitor through the FET when a heat pulse signal sent to the heating element ends,
  send a signal to the capacitor to pre-charge the capacitor associated with a respective heating element to a predetermined voltage.

14. A method of detecting a level of printable fluid in a container comprising:
  with at least one sensing location on a die in thermal contact with the printable fluid in the container, sensing a voltage of a capacitor over time as the capacitor leaks through a field effect transistor (FET), the FET and capacitor being associated with the sensing location;
  based on the voltage of the capacitor over time and a threshold voltage, determining whether the printable fluid is present at the at least one sensing location.

15. The method of claim 14, further comprising:
  sending a heat pulse signal to a heating element located juxtaposition to the sensor to heat the heating element;
  pre-charging the capacitor associated with a respective heating element to a predetermined voltage; and
  discharging the capacitor through the FET when the heat pulse signal ends,
  wherein:
    the FET cools at a first cooling rate relatively faster than a second cooling rate,
    the first cooling rate defines a first capacitor current leak off rate that is slower than a second capacitor current leak off rate, and
    the first capacitor current leak-off rate indicates the presence of the printable fluid at the at least one sensing location.

16. The fluid level sensor of claim 1, wherein at least one of the sensing locations is disposed on a die that includes both the capacitor and FET of the at least one sensing location, the capacitor discharging by leaking current through the FET.

17. The fluid level sensor of claim 3, wherein the heating element comprises a resistor that emits heat for a specific amount of time during application of the heat pulse sent by the control logic.

18. The fluid level sensor of claim 2, wherein a command interface is connected to the control logic for the control logic to both actuate a sensing location and to receive output of the voltage comparator.

19. The fluid level sensor of claim 18, wherein the voltage threshold is variable and is input to the voltage comparator from the control logic via the command interface.

20. The fluid level sensor of claim 18, wherein the command interface is digital to support communication using digital signals.

* * * * *